(12) United States Patent
O'Connor et al.

(10) Patent No.: US 7,972,549 B2
(45) Date of Patent: Jul. 5, 2011

(54) DIRECT FORMING OF NON-TEXTILE FABRIC ELEMENTS FROM PLASTIC PELLETS

(75) Inventors: Gregory W. O'Connor, Littleton, CO (US); James S. Gregg, Aurora, CO (US)

(73) Assignee: Samsonite IP Holdings S.a.r.l., Luxembourg (LU)

( * ) Notice: Subject to any disclaimer, the term of this patent is extended or adjusted under 35 U.S.C. 154(b) by 1546 days.

(21) Appl. No.: 10/373,423

(22) Filed: Feb. 24, 2003

(65) Prior Publication Data
US 2003/0180540 A1 Sep. 25, 2003

Related U.S. Application Data

(62) Division of application No. 09/677,047, filed on Sep. 29, 2000, now abandoned.

(60) Provisional application No. 60/162,344, filed on Oct. 29, 1999.

(51) Int. Cl.
*B29C 45/14* (2006.01)
*B29C 59/02* (2006.01)
*B32B 37/00* (2006.01)
*F41H 1/02* (2006.01)
*F41H 1/04* (2006.01)
*B32B 7/08* (2006.01)

(52) U.S. Cl. ........ 264/263; 264/167; 264/242; 264/249; 264/251; 264/261; 264/267; 264/277; 264/285; 264/320; 428/223; 2/2.5

(58) Field of Classification Search ................. 264/167, 264/242, 249, 251, 261, 263, 285, 320, 267, 264/277; 428/223; 2/2.5, 161.7
See application file for complete search history.

(56) References Cited

U.S. PATENT DOCUMENTS
2,139,512 A * 12/1938 Nagorny ................. 63/37
(Continued)

FOREIGN PATENT DOCUMENTS
CA 2259486 1/1998
(Continued)

OTHER PUBLICATIONS

Pawloski et al., "Part Performance is Improved Via Solid-Phase Forming," Modern Plastics, Dec. 1985.
(Continued)

*Primary Examiner* — Christina Johnson
*Assistant Examiner* — Atul Khare
(74) *Attorney, Agent, or Firm* — Dorsey & Whitney LLP

(57) ABSTRACT

A process, and related structure, uses conventional pelletized compositions to form the elements of a non-textile fabric by coining a single pellet or briquette of a polymer into an individual element in a single forming step. The steps of the process generally include: a) positioning a pellet in or adjacent to a mold cavity, and b) forcing the pellet into contact with the mold surfaces of the mold cavity to plastically deform the pellet to the shape of the mold cavity. The forcing step preferably uses an energy and speed where the pellet superplastically deforms to substantially fill the mold cavity. This process is repeated with the elements being formed in the appropriate order to form a non-textile fabric. The elements thus formed can have a variety of shapes, and can form base units for the formation of the non-textile fabric of two, three or more elements.

33 Claims, 16 Drawing Sheets

U.S. PATENT DOCUMENTS

| | | | |
|---|---|---|---|
| 2,256,645 A | | 9/1941 | Kuhlman |
| 2,291,545 A | | 7/1942 | Ganz et al. |
| 2,335,222 A | | 11/1943 | Storch |
| 2,354,485 A | | 7/1944 | Slaughter |
| 2,366,274 A | | 1/1945 | Luth et al. |
| 2,388,297 A | | 11/1945 | Slaughter |
| 2,500,258 A | | 3/1950 | Mazzoni |
| 2,776,521 A | * | 1/1957 | Zimmerman ................ 446/115 |
| 2,920,354 A | | 1/1960 | Zumbrunnen |
| 3,000,049 A | * | 9/1961 | Terry, Jr. ................ 16/334 |
| 3,175,028 A | | 3/1965 | Waldes et al. |
| 3,197,535 A | | 7/1965 | Morin |
| 3,328,503 A | * | 6/1967 | Ancker ................ 264/175 |
| 3,381,563 A | * | 5/1968 | Bishop ................ 83/303 |
| 3,608,034 A | | 9/1971 | Bramley et al. |
| 3,661,689 A | | 5/1972 | Spanier |
| 3,714,320 A | | 1/1973 | Shaw |
| 3,746,602 A | | 7/1973 | Carolii et al. |
| 3,813,281 A | | 5/1974 | Burgess et al. |
| 3,947,204 A | | 3/1976 | Ayres et al. |
| 3,959,542 A | * | 5/1976 | Livermore ................ 428/44 |
| 3,992,765 A | | 11/1976 | Silverbush et al. |
| 3,993,725 A | | 11/1976 | Brown |
| 4,014,965 A | | 3/1977 | Stube |
| 4,014,970 A | | 3/1977 | Jahnle |
| 4,055,019 A | | 10/1977 | Harvey |
| 4,065,539 A | | 12/1977 | Nadel |
| 4,065,950 A | | 1/1978 | Green et al. |
| 4,090,322 A | | 5/1978 | Hake |
| 4,097,324 A | * | 6/1978 | Emmel ................ 156/179 |
| 4,115,489 A | | 9/1978 | Macfee |
| 4,176,149 A | | 11/1979 | Moertel |
| 4,198,707 A | | 4/1980 | Haupt et al. |
| 4,217,326 A | | 8/1980 | Goralnik |
| 4,229,496 A | | 10/1980 | Striegel |
| 4,296,533 A | | 10/1981 | Doerter |
| D263,483 S | | 3/1982 | Chen |
| 4,323,531 A | | 4/1982 | Bradley et al. |
| 4,329,311 A | | 5/1982 | Moertel |
| 4,352,766 A | | 10/1982 | Bradley et al. |
| 4,386,043 A | | 5/1983 | Takeshima |
| 4,409,275 A | | 10/1983 | Samowich |
| 4,442,150 A | * | 4/1984 | Greiner et al. ................ 428/53 |
| 4,451,421 A | * | 5/1984 | Jones et al. ................ 264/167 |
| 4,493,865 A | | 1/1985 | Kuhlmann et al. |
| 4,510,108 A | | 4/1985 | Cleereman et al. |
| 4,559,251 A | | 12/1985 | Wachi |
| 4,564,539 A | | 1/1986 | Tsuji |
| 4,731,041 A | | 3/1988 | Ziegler |
| 4,731,212 A | | 3/1988 | Hasegawa |
| 4,732,724 A | | 3/1988 | Sterner |
| 4,806,405 A | | 2/1989 | Liebl |
| 4,830,809 A | | 5/1989 | Liebl |
| 4,842,905 A | | 6/1989 | Stech |
| 4,851,274 A | | 7/1989 | D'Elia |
| 4,888,145 A | | 12/1989 | Allner et al. |
| 4,929,505 A | | 5/1990 | Washburn et al. |
| 4,930,832 A | | 6/1990 | Shelton |
| 4,938,913 A | | 7/1990 | Ward et al. |
| 4,948,355 A | | 8/1990 | Knoll |
| 4,951,689 A | | 8/1990 | Jones |
| 5,100,358 A | | 3/1992 | Volgger |
| 5,148,591 A | | 9/1992 | Pryor |
| 5,157,804 A | | 10/1992 | Williams |
| 5,163,552 A | | 11/1992 | Thuswaldner |
| 5,183,430 A | | 2/1993 | Swann |
| 5,202,166 A | * | 4/1993 | Crompton et al. ................ 428/33 |
| D339,265 S | | 9/1993 | Claesson |
| 5,272,805 A | | 12/1993 | Akeel et al. |
| 5,285,567 A | | 2/1994 | Thuswaldner |
| 5,306,532 A | * | 4/1994 | Tsien et al. ................ 428/33 |
| 5,316,820 A | | 5/1994 | Harpell |
| 5,316,823 A | | 5/1994 | Etchu et al. |
| 5,331,232 A | | 7/1994 | Moy et al. |
| 5,333,532 A | | 8/1994 | Smirlock et al. |
| 5,339,598 A | | 8/1994 | Rink et al. |
| 5,345,679 A | | 9/1994 | Lennon et al. |
| 5,354,531 A | | 10/1994 | Gumbert |
| 5,376,322 A | | 12/1994 | Younessian |
| 5,381,339 A | | 1/1995 | Yoko et al. |
| 5,388,318 A | | 2/1995 | Petta |
| 5,472,365 A | | 12/1995 | Engel |
| 5,515,541 A | | 5/1996 | Sacks et al. |
| 5,523,141 A | | 6/1996 | Fyler |
| 5,601,895 A | | 2/1997 | Cunningham |
| 5,651,169 A | | 7/1997 | Ohuchi et al. |
| 5,668,555 A | | 9/1997 | Starr |
| 5,732,194 A | | 3/1998 | Jones |
| 5,792,974 A | | 8/1998 | Daqis et al. |
| 5,813,114 A | | 9/1998 | Blacket et al. |
| 5,844,814 A | | 12/1998 | Chliwnyj et al. |
| 5,853,863 A | * | 12/1998 | Kim ................ 428/223 |
| 5,906,873 A | * | 5/1999 | Kim ................ 428/57 |
| 5,917,726 A | | 6/1999 | Pryor |
| 5,947,311 A | | 9/1999 | Gregory |
| 5,963,712 A | | 10/1999 | Fujita et al. |
| 5,964,393 A | | 10/1999 | Feldpausch et al. |
| 5,983,467 A | | 11/1999 | Duffy |
| 5,989,480 A | | 11/1999 | Yamazaki |
| 6,037,031 A | | 3/2000 | Jones et al. |
| 6,071,455 A | | 6/2000 | Hutchison et al. |
| 6,116,980 A | | 9/2000 | Bauer |
| 6,159,590 A | | 12/2000 | Kim |
| 6,607,684 B1 | * | 8/2003 | Lee et al. ................ 264/230 |
| 7,807,247 B1 | | 10/2010 | Bromley et al. |
| 2004/0192138 A1 | | 9/2004 | King et al. |
| 2005/0214499 A1 | | 9/2005 | O'Connor et al. |

FOREIGN PATENT DOCUMENTS

| | | |
|---|---|---|
| CA | 2291003 | 12/1998 |
| EP | 0121433 | 10/1984 |
| EP | 0179171 | 4/1986 |
| EP | 0357282 | 3/1990 |
| EP | 0657110 | 8/1994 |
| EP | 0955515 | 11/1999 |
| FR | 482337 | 3/1917 |
| FR | 2193702 | 7/1972 |
| FR | 2397166 | 7/1977 |
| GB | 2261589 | 5/1993 |
| GB | 2287639 | 9/1995 |
| GB | 2302794 | 2/1997 |
| JP | 2000-186899 | 4/2000 |
| WO | WO 92/08094 | 5/1992 |
| WO | WO 93/08094 | 5/1993 |
| WO | WO 93/21492 | 10/1993 |
| WO | WO 95/07033 | 3/1995 |
| WO | WO 98/00039 | 1/1998 |
| WO | WO 98/53715 | 12/1998 |
| WO | WO 01/32404 | 5/2001 |
| WO | WO 02/43955 | 6/2002 |

OTHER PUBLICATIONS

Raspor et al., "Solid-Phase Forming and Coforming of High-Performance Thermoplastics," 1988.

Titus, Joan B., "Solid-Phase Forming (Cold Forming) of Plastics," Jan. 1972.

* cited by examiner

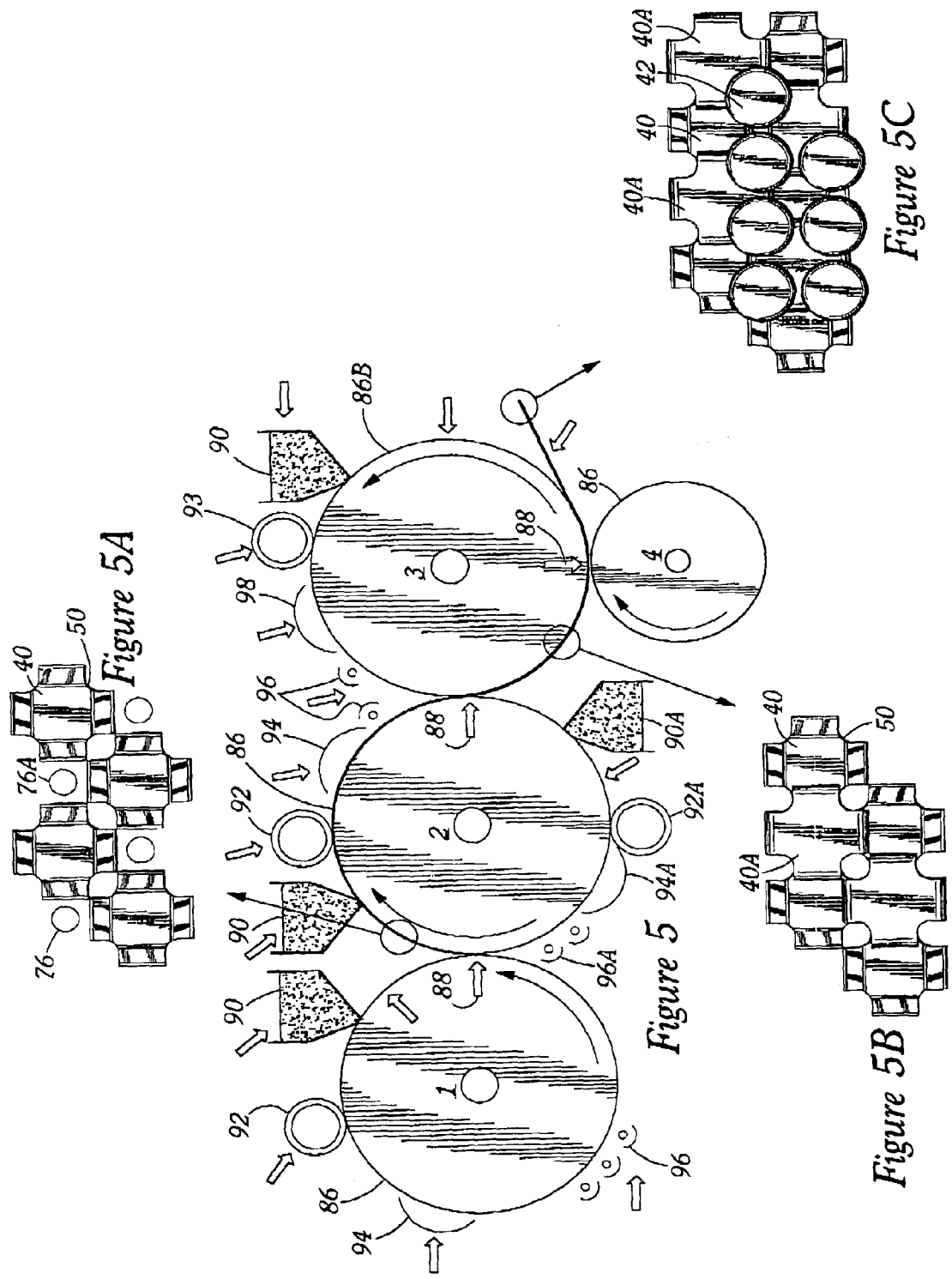

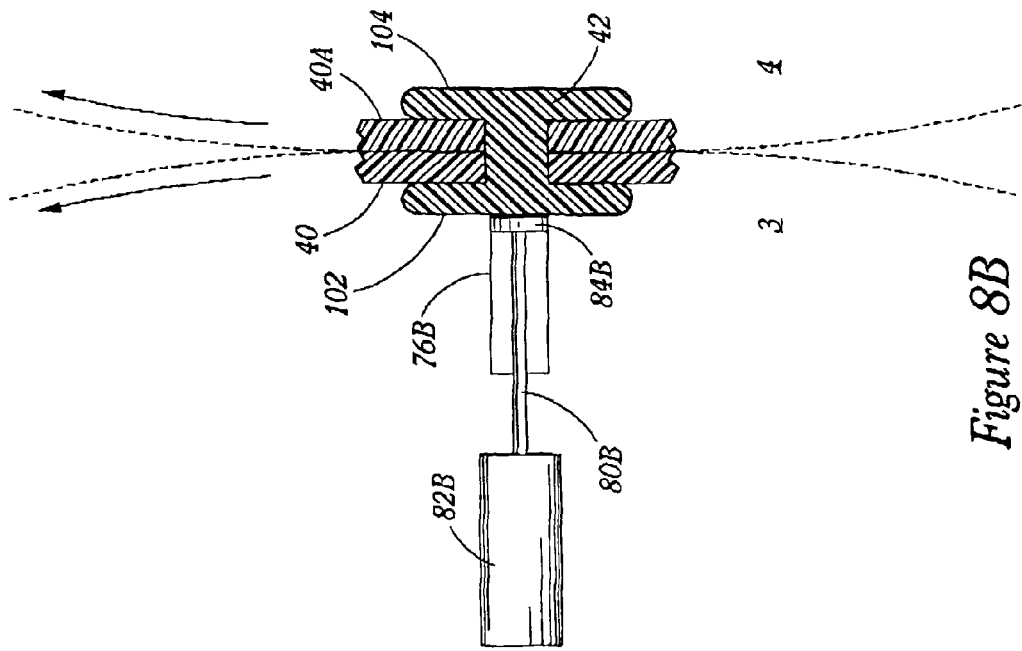
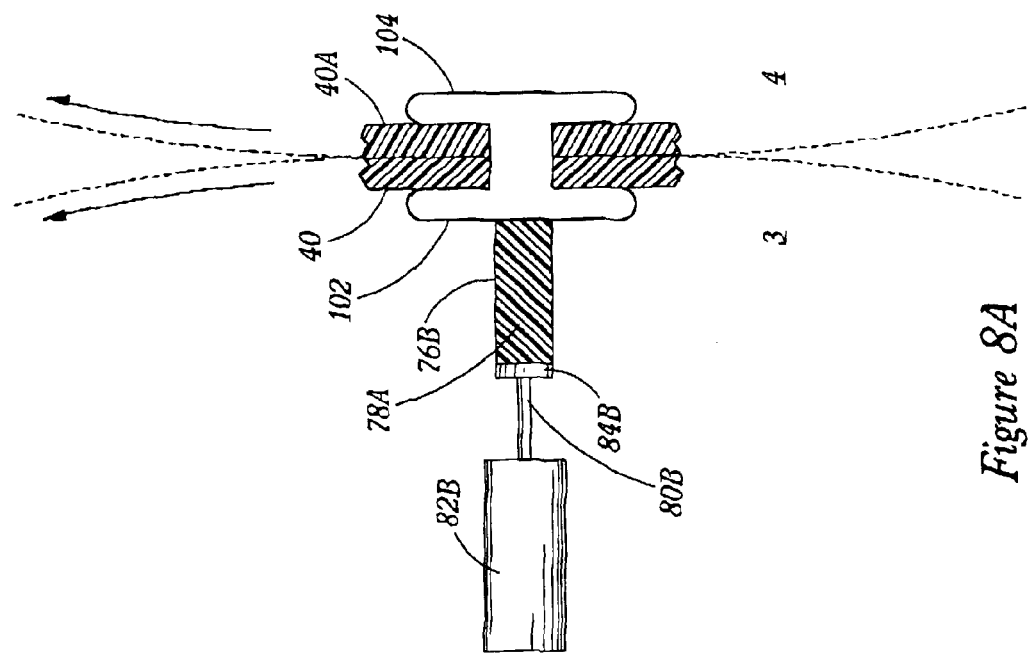

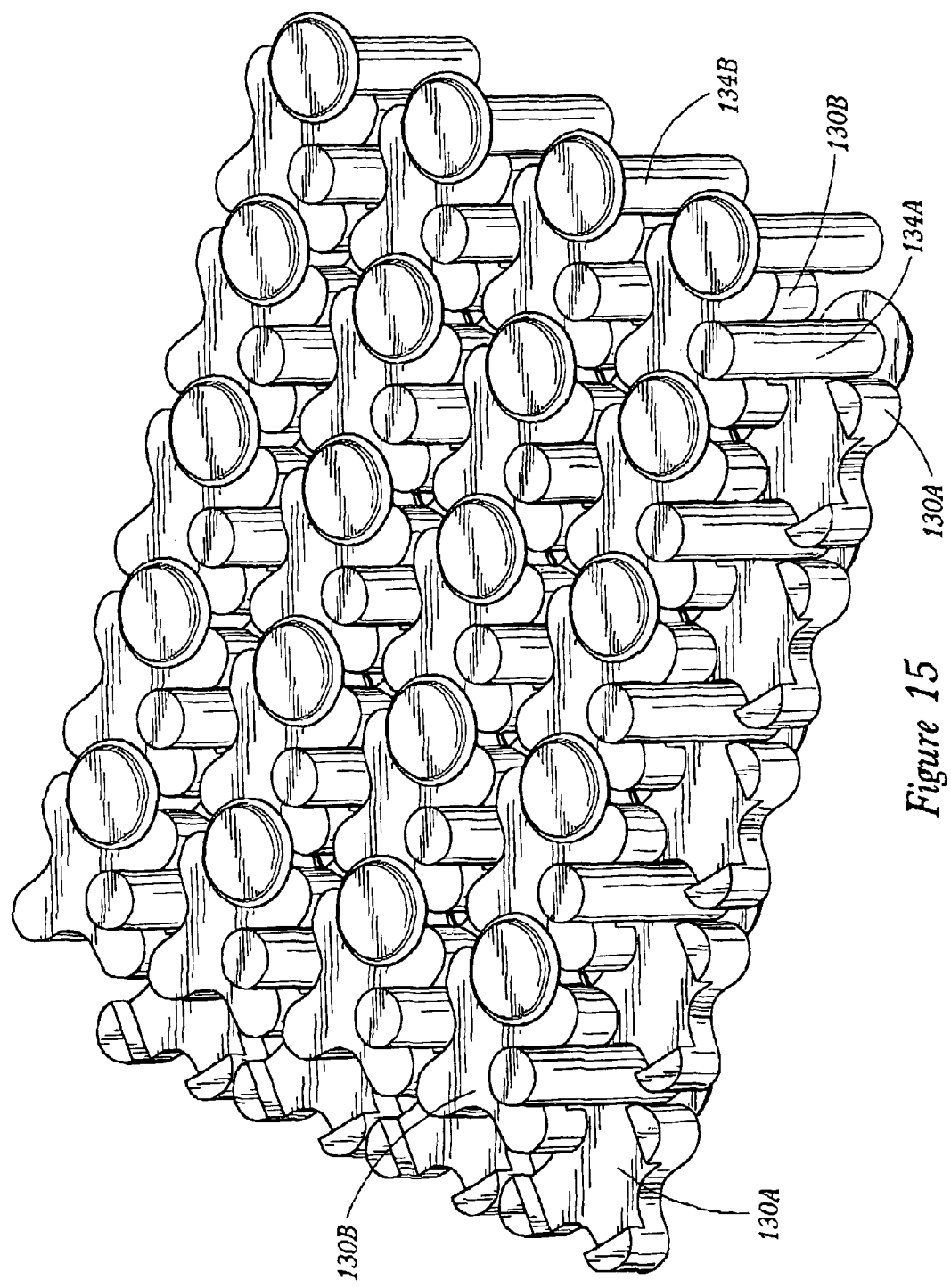

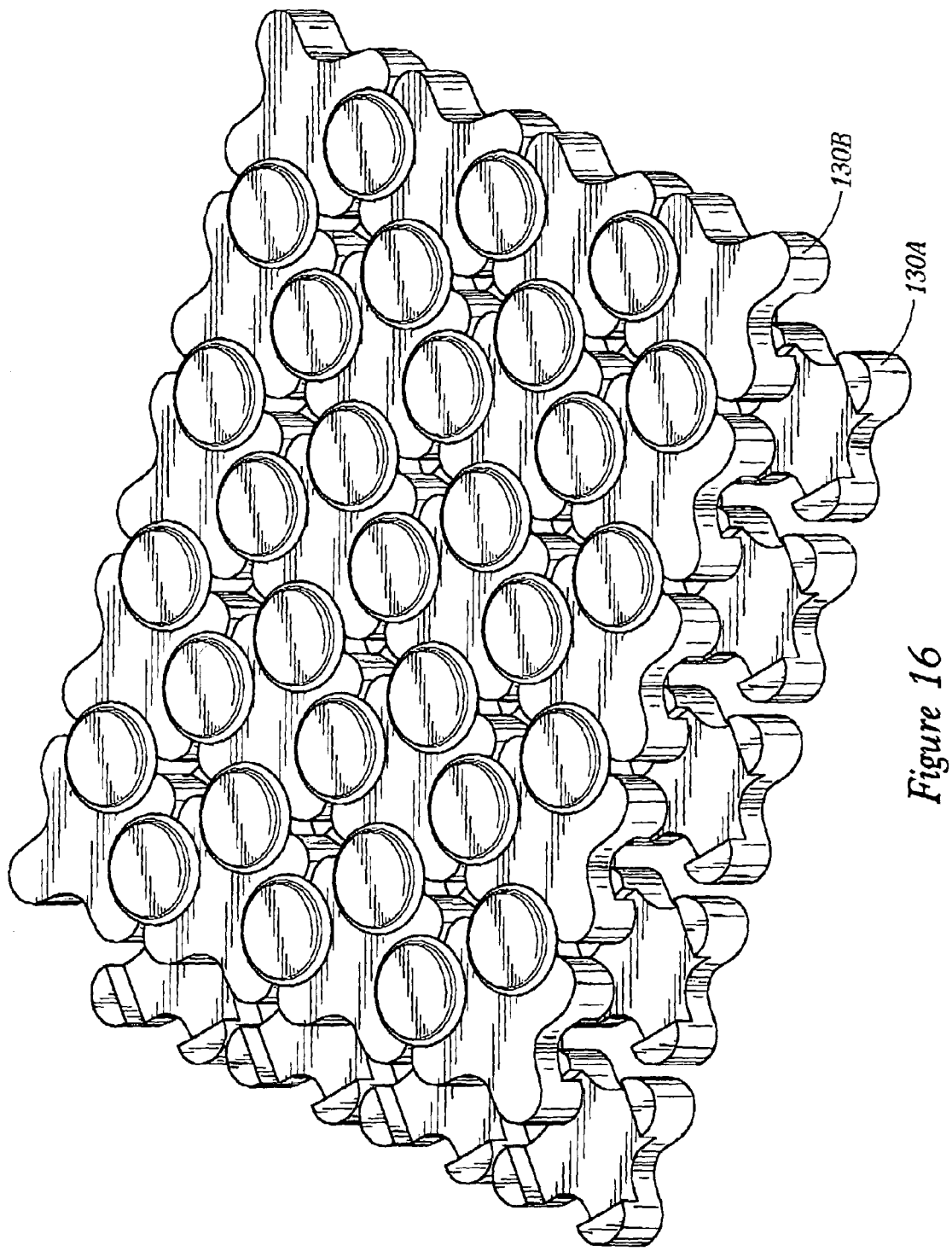

DIRECT FORMING OF NON-TEXTILE FABRIC ELEMENTS FROM PLASTIC PELLETS

CROSS-REFERENCE TO RELATED APLLICATIONS

This application is a divisional of U.S. patent application Ser. No. 09/677,047, filed Sep. 29, 2000, now abandoned, entitled "Direct Forming of Non-Textile Fabric Elements From Thermoplastic Pellets or the Like," which claims the benefit under 35 U.S.C. § 119(e) to U.S. Provisional Patent Application Ser. No. 60/162,344, entitled "Direct Forming of Non-Textile Fabric Elements From Thermoplastic Pellets or the Like" and filed on Oct. 29, 1999.

FIELD OF THE INVENTION

This invention relates to a combination polymer processing and article manufacturing process, and more particularly relates to a method and process for creating uniquely shaped polymer elements in an interlinked structure.

BACKGROUND

The use of plastics has become pervasive in present-day products of all types. The processes by which plastics are formed into or integrated as specific elements with the products have been carefully developed to generally maximize the volume of product output and performance characteristics of the resulting plastic products. Typically, the polymer process is used to form an individual product or element, such as a packaging structure (plastic bottle) or an individual element of a larger article (gear member for a low power drive train, or a filament of thermoplastic for combining into yarn or synthetic textiles).

The traditional and well-known plastic forming processes include, among others, injection molding, blow molding, and extrusion. Each of these forming processes has several related sub-processing techniques, but in the end they all rely on at least one common characteristic: the plastic starting material must be transformed into a molten state for the process to perform as desired. The molten thermoplastic stream is generated by masticating plastic pellets (and perhaps some "regrind" from the offal of previous molding processes) to work heat the resulting mass to molten temperatures. This molten requirement mandates the use of relatively complex equipment, and the processing parameters must be precisely controlled for successful processing. These forming processes are also somewhat limited in that there are limitations on the type of products that can be made. The material parameters of the final products made using these forming processes, such as surface properties, chemical resistance, electrical properties, optical properties, melt properties, tensile strength, shear strength, elasticity and rigidity can be compromised as a result of these traditional plastic forming processes. Some of these forming processes also create substantial scrap material that may be later recycled into the molten plastic prior to continued processing.

These limitations become more important when the desired product made of the plastic is required to be flexible, durable, strong and easily assembled, such as a non-textile fabric. Non-textile fabric here means a generally flexible web made of individual interconnected elements, the web having many of the characteristics of textile fabric, but not depending on fibers or fiber related processes for these characteristics. Chain mail is one example of a non-textile fabric.

Another plastic forming process is solid phase forming, also called superplastic forming by Shell Development Company, and "Scrapless Forming of Plastic Articles" by Dow Chemical Company. This solid phase forming process is used to create plastic articles having high heat distortion temperatures, expanded or porous layers with integrally formed skin, using ultra high molecular weight polymers, and blended or layered structures of two or more materials. A related process is also used in the forming of metals, particularly aluminum, to form forged aluminum shapes from precisely formed slugs of metal. While solid phase forming can be used to create plastic products that generally overcome the short falls of the previously described forming processes, solid phase forming itself has not been utilized to directly form an interconnected structure.

Another shortcoming of these plastic forming processes is that the subsequent manufacturing steps for integrating the formed product into the final embodiment includes further handling of the formed product. This further handling to assemble the final product is expensive, both in labor costs and speed of production.

SUMMARY OF THE INVENTION

The instant invention as described herein overcomes the shortcoming of the above-referenced polymer forming processes, and includes the molding, in place, of interconnected elements into a non-textile type fabric using solid-phase molding techniques, preferably from conventionally produced polymer pellets. This combination is referred to as direct forming. The interconnected elements are molded directly into their assembled positions in a continuous web, or other shape, of the resulting fabric. Forming the elements into their final assembled structure, that is interconnected with other elements, eliminates the need to further handle the elements in an assembly process, such as having to accumulate the elements and then array the accumulated elements in order to connect the array together. Thus, time, labor and scrap costs are significantly reduced, and efficiency is significantly increased. Again, non-textile fabric as used herein means a generally flexible web made of individual interconnected elements, the web having many of the characteristics of textile fabric, but not depending on fibers or fiber related processes for these characteristics.

The inventive solid phase forming process uses conventional pelletized thermoplastic compositions to form the elements of a non-textile fabric by coining a single pellet or briquette of the polymer into an individual element in a single forming step. The elements used to form a particular non-textile fabric can vary greatly, but for purposes of example, as explained in detail below, the elements include plates and rivets that are interconnected together.

The steps of the process generally include: a) positioning a pellet in or adjacent to a mold cavity, and b) forcing the pellet into contact with the mold surfaces of the mold cavity to plastically deform the pellet to cause the pellet to adapt the shape of the mold cavity. The mold cavity has a shape to form the desired element, and its volume is substantially the same as the volume of the pellet. The forcing step or act preferably uses an energy and speed wherein the pellet superplastically deforms to substantially fill the volume of the mold cavity. This process is repeated with the particular element being formed in the appropriate order to form interconnected plates and rivets, as an example, with the final result being a non-textile fabric.

In an embodiment of the present invention, an array of mold cavities is provided, and each mold cavity for each fabric element has a pellet receiving recess or chamber in one side that normally opens into the mold cavity. A wall of this recess is defined by an end surface of a ram or striker. The ram or striker can be in a withdrawn position to expose the recess for receiving the pellet, or the ram can be positioned to close or fill the recess and thus not receive a pellet. Thus, by prepositioning the ram, only those recesses opposite the mold cavities where plates or rivets are needed can receive a pellet, and thus will form a plate or rivet. The mold cavity forms the desired shape of the formed element. Once the pellet is positioned in the pellet receiving recess and the recess is aligned with the mold cavity, the ram is actuated to force the pellet into the mold cavity. The ram is actuated with sufficient force to cause the pellet to plastically deform and substantially conform to the shape of the mold cavity. The pellet may need to be pre-heated to a softened condition depending on the type of pellet used. The type of pellet, and especially its chemical makeup, is determined by the desired physical characteristics of the final product. As noted above, the element described herein is either a plate or rivet element for creating the non-textile fabric.

This process can then be repeated in a manner where portions of the first formed element are used as a part of the mold cavity for the next forming step.

This process is best carried out with a series (preferably two or three but most preferably, four) mutually interengaging rollers. The outer cylindrical surface of a roller forms one side or the other of arrays of plate forming mold cavities. These arrays of mold cavity sides come together at the nip between the rollers (lines of tangency between a pair of rollers aligned parallel to one another). Interiors of the rollers include the chambers aligned with each mold cavity's sides on the cylinder's outer surface. These chambers receive the pellets and the rams and ram driving devices (preferably electromagnetic solenoids or the like). The first and second of these three rollers mold arrays of plates needed to form a first layer of plates for forming the non-textile fabric. The second and third rollers mold the arrays of plates needed to form the second layer of overlapping plates, preferably partially overlapping onto and being operably engaged with the plates of the first layer. The third and fourth rollers mold the arrays of headed rivets directly onto and through the thus overlapping first and second layers of plates. These assembled arrays can be completed at this time. That is, the headed rivets can be set, i.e. the second end of the rivet can be headed substantially simultaneously with being inserted through the layers of plates. Alternatively, the non-textile fabric shapes can be handled and only later need the rivets be set, owing to the natural tendency of the non-textile fabric elements to hold together as formed. A further alternate comprises a simplified plate configuration that has the first and second arrays of plates that interconnect directly to form non-textile fabric webs and shapes.

When automated in a manner as will be detailed, this direct molding process will provide several advantages. The inventive direct forming process provides for optimum process history for the polymer compound from which the elements have been formed. Each pellet has a minimum or non-existent thermal degradation from its processing since there is very little heating in comparison to conventional polymer forming processes, such as injection molding or extrusion. While there is possibly some heating to place the pellet above its softening point but below its melt temperature, or just below the crystalline melting point for semicrystalline polymers, this heating is brief and at temperatures considerably below that required for melting and fusion typical in these and other processes. Thus, this heating is not believed to detrimentally impact the performance characteristics of the direct-formed elements. Of course there would be momentary heating resulting from the solid phase or superplastic deforming at the time of molding. But there would be no mastication, mixing or consolidation of the molten mass of thermoplastic usually experienced in conventional injection molding or extrusion, nor would these polymer pellets experience elevated temperatures for the long periods of time associated with the injection molding and extrusion processes.

In addition, since the pellet volume is designed to substantially equal the volume of the mold cavity, there should be no significant waste or trimmings resulting from the direct forming process. The output of the direct forming process is only the non-textile fabric elements pre-positioned and manufactured into the final desired shape and interconnected orientation. If any pellets or any elements formed cannot be used for the fabric shapes, these could be considered "virgin" material, being without thermal or mechanical degradation. Thus, these can be added easily to the feedstock on otherwise conventional injection molded processes or reformed into pellets for further direct form processing.

Additionally, the direct forming process results in extremely rapid production cycle times. Since the direct forming process neither requires or creates much heat energy (e.g. only the heat created by the plastic deformation of the pellets plus any pre-heating residual), and the direct formed elements are very small in size to create little heat inertia due to the mass, mold cooling cycles can be extremely short. Also, direct forming of the elements in interconnected relationships simplifies the final assembly of the non-textile fabric. The elements can be assembled to interconnect with one another at substantially the same time that they are formed, thus eliminating interim storage, picking and positioning of elements to form the non-textile fabric structure. Also, in some instances, the final non-textile fabric sheet does not require post forming handling, such as cutting or shearing, prior to further assembly since only the elements needed would be molded and joined at the time of forming.

Further, the fit of adjacent and interconnected elements can be made almost perfectly since portions of adjacent elements form part of the mold cavity for the overlying plates and partially or fully set rivets.

More specifically with respect to a method of manufacture of a non-textile fabric, one aspect of the instant invention includes the acts of forming a first element and forming a second element in operable connection with the first element. In further detail, forming the first element includes the act of solid phase forming the first element, and forming the second element includes the act of solid phase forming the second element.

With respect to another feature of the present invention related to the manufacture of a non-textile fabric, the inventive method includes the acts of forming a first element, forming a second element, and forming a third element such that the first, second and third elements are operably connected to one another. In further detail, each of these forming acts includes solid phase forming.

Regarding another aspect of the present invention, specifically regarding a three-roller process, the present invention includes the acts of providing a first roller, a second roller, a third roller, and a first nip region between the first and second nip rollers, and a second nip region between the second and third nip rollers. A first element is formed at the first nip region, and a second element is formed at the second nip region, with the second element being formed in an interconnected manner with the first element.

Regarding another aspect of the present invention, specifically regarding a four roller process, the present invention includes the acts of providing a first roller, a second roller, a third roller, and a fourth roller; and a first nip region between the first and second nip rollers, a second nip region between the second and third nip rollers, and a third nip region between the third and fourth rollers. A first element is then forming at the first nip region, a second element is formed at the second nip region, the second element being formed in an inter-engaging manner with the first element, and a third element is formed at the third nip region. The third element is formed so as to interconnect the inter-engaging first and second elements.

With respect to another aspect of the present invention, a non-textile fabric of individual elements is made of elements manufactured by solid phase forming. In particular detail, each element is sized to be made from a single polymer pellet.

Another aspect of the present invention is the formation of a non-textile fabric of individual elements including a first element type and a second element type, wherein the first and second element types are attached to one another to allow relative movement of each element with respect to the other.

A further aspect of the present invention related to the structure of a base unit for use in making a non-textile fabric includes the base unit including a first element, a second element, and an attachment element for attaching the first element to the second element such that the first, second and attachment element can move with respect to one another.

In another aspect of the present invention related to the structure of a base unit for use in making a non-textile fabric includes the base unit including a first element, and a second element including an integrally-formed attachment element, the attachment element connecting the first element and the second element together and allowing the first and second elements to move with respect to one another.

In general, the benefits of solid-phase forming are cumulative to the benefits of the direct forming of the interconnected elements. The solid-phase forming process can use commodity thermoplastic feedstocks by taking advantage of enhanced elastic modulus, ultimate tensile yield strength, and low and high temperature impact strengths that result from solid-phase forming. These beneficial characteristics help make the non-textile fabric even more durable with enhanced performance qualities.

Additionally, the direct forming process can also take advantage of engineered thermoplastic compounds. Such higher performance thermoplastics have been impractical for wide spread use in commodity consumer products like luggage, primarily due to such materials' higher per unit costs. However, because of the very high efficiencies (low scrap rate, brief cycle times, etc.) expected from this invention, such more expensive materials may come under consideration. Also, processing additives for preventing extruder degradation would not be needed. These cost savings could be used to offset the more expensive engineered polymer feedstocks.

The direct forming process is also beneficial because it allows the use of higher practical temperature plastics. In some products, such as conventionally injection molded luggage shells, much of the wall thickness is dictated not merely to withstand the routine abuses of travel. The walls are made thicker to also permit molten thermoplastic to flow into those areas during molding. Also, some walls and sections are made especially thick to prevent unacceptable distortion when the article is subjected to unusual but predictable heating, such as in the closed trunk of a car in the sun. These thicker sections serve to isolate some portions of the injected plastic article from reaching heat reversion temperatures, as well as support the article in a relatively undistorted position until the unusually high temperature situation has passed. The inventive process breaks free of this melt temperature trap. The processing temperature can be quite low when compared to conventional injection molding of these compounds since the pellet feed stock need not be brought all the way to molten temperatures for processing into final shape. Thus, by permitting easy use of high melt point polymers, the inventive process can make lighter, stronger luggage and other similar products.

The pellet feed stock can be quite viscous during final molding in the inventive process. The fabric elements, relative to a typical luggage shell for example, do not have □thin□ sections through which the thermoplastic must flow to fill the mold cavity. The direct forming process permits using many thermoplastic compounds that will fill the small element forming molds, but would not flow to fill the molds for injection-molded shells.

Other aspects, features, and details of the present invention can be more completely understood by reference to the following detailed description of a preferred embodiment, taken in conjunction with the drawings and from the appended claims.

BRIEF DESCRIPTION OF THE DRAWINGS

FIG. 5 is a schematic view of one embodiment of the equipment used to perform the process of the present invention, including showing a plurality of work surfaces formed on the outer surfaces of rollers, and various processing steps both inside the rollers and on the outer surfaces.

FIG. 5A shows a portion of the surface of the second roller, showing the previously formed legs-up plates and the recesses for holding polymer pellets used to form the legs-down plates.

FIG. 5B shows a portion of the surface of the third roller, showing the previously formed legs-up and legs-down plates prior to the act of forming the rivet to hold the plates in an operable configuration.

FIG. 5C shows a portion of the non-textile fabric formed by the process of the present invention.

FIGS. 8A and B are representational section views showing the solid phase forming steps for forming the rivet element of the non-textile fabric, such steps making up a portion of the process of the present invention.

FIG. 15 shows a section of the non-textile fabric formed by the alternative embodiment plate of FIG. 14, prior to the rivet heads being formed on the rivet structure.

FIG. 16 shows a section of the non-textile fabric formed by the alternative embodiment plate of FIG. 14, after the rivet heads are formed on the rivet structure.

DETAILED DESCRIPTION OF THE INVENTION

The present invention utilizes the principles of solid phase forming. The use of solid phase forming techniques was summarized in 1972 by the Plastics Technical Evaluation Center, Picatinny Arsenal, Dover, N.J., in Report No R42 titled "Solid-Phase Forming (Cold Forming) of Plastics." This document is hereby incorporated by reference in its entirety. The instant invention as described herein includes the molding, in place, of each of the interconnected elements in a non-textile type fabric, such as that disclosed in U.S. Pat. No. 5,906,873 and U.S. Pat. No. 5,853,863 (which patents, to the extent they are consistent with this application, are hereby incorporated by reference) using such solid-phase molding techniques. While the particular form of non-textile fabric disclosed in these patents is the preferred material to be produced by this invention, it is contemplated that any other array of miniature, linked plastic units to form a flexible, non-textile (not fiber based) fabric would benefit from the disclosed innovations.

The manufacturing process of the present invention is described herein with respect to the assembly of a non-textile fabric (NTF). One of the intended uses of the non-textile fabric is as an outer surface for luggage, or other like articles, where a durable, flexible outer surface is desired to withstand various types of physical abuse. Other various uses for the non-textile fabric are possible and contemplated.

Figure 1A:
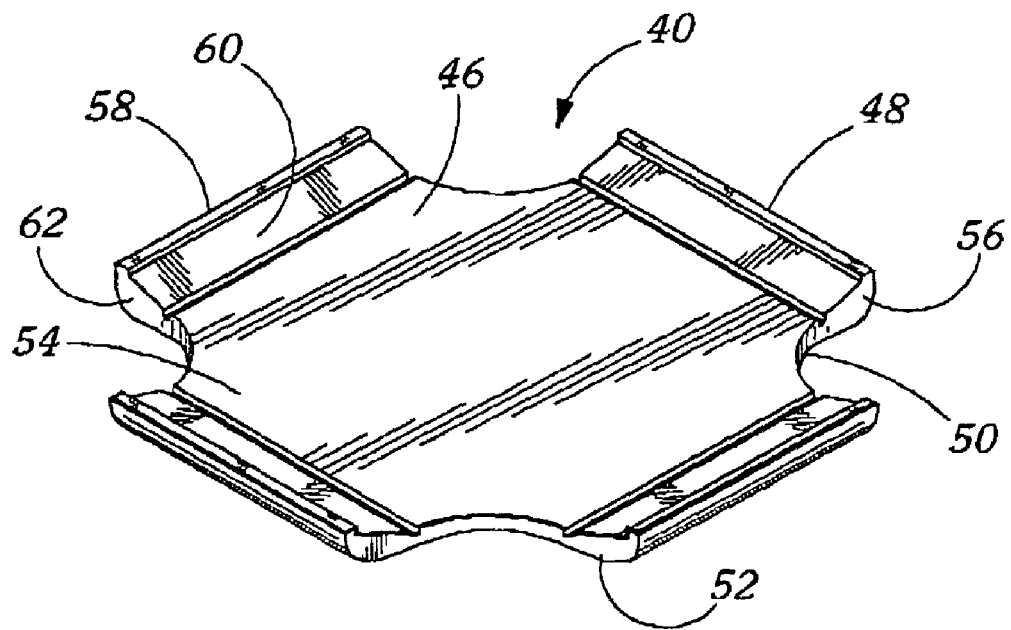
FIG. 1A is a front perspective view of a plate element which forms part of the non-textile fabric produced by the present invention.
Figure 1B:
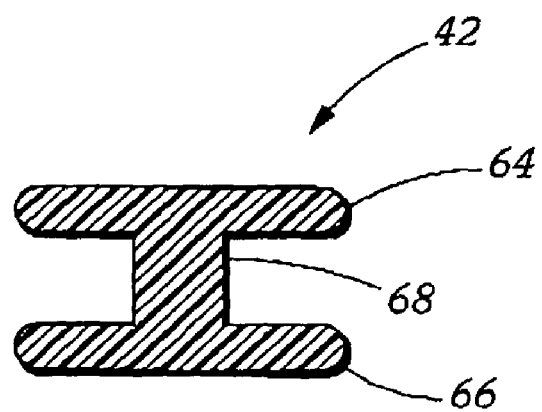
FIG. 1B is a representational section of a rivet used to operably connected the plate elements to form the non-textile fabric produced by the present invention.

The inventive manufacturing process and resulting product are described hereinafter. An example of the product is described first to facilitate an understanding of the process by which it is manufactured. The non-textile fabric in the exemplary structure is made up of separate plate elements and rivet elements interconnected together in a particular orientation. An example of a plate element 40 is shown in FIG. 1A, and an example of a rivet element 42 is shown in FIG. 1B. An example of the non-textile fabric 44 when formed by these separate elements 40 and 42 during the inventive process is shown in FIG. 2.

The plate element 40 in FIG. 1A is shown in a "legs-up" position. The following plate structure is one of many believed to work in the formation of the non-textile fabric, and is described by way of example. The plate element 40 includes a generally square main body 46 having four sides, each defining an edge 48. Each edge 48 extends a majority of the length of the side. A curved cutout 50 is formed between adjacent sides of the plate element 40, basically at the corners of the main body. The main body 40 has a top surface 52 and a bottom surface 54. Each edge 48 curves away from the top surface 52 to extend at approximately 90 degrees relative to the bottom surface 54. Each bent edge 48 forms a leg 56, and each leg defines an engagement structure thereon.

The engagement structure has inter-engaging surfaces which may include top walls, sidewalls, and sloping cam surfaces. In the preferred embodiment, a top ridge 58 has a flat top wall and sidewalls perpendicular to the main body 46 of the plate member. The ridge 58 extends coincidentally with the edge 48. A sloped cam surface 60 extends down to the bottom surface 54 of the main body 46. A groove 62 is formed in the main body and extends parallel to the ridge 58. The groove 62 is sized to receive a corresponding ridge 58 of an adjacent plate member therein, as described below with respect to the engagement of adjacent plate members. This engagement structure could be modified in many ways and still function as desired. One such non-limiting modification includes that the ridge could extend longer or shorter than the edge, the ridge could have a different profile, the sloped cam surface can be curved or linear, and the groove could be of a different size or have sloped sidewalls.

A representative section of the rivet 42 is shown in FIG. 1B. Generally, the rivet 42 has disc-shaped top 64 and bottom 66 heads and a shaft 68 extending therebetween. The heads are fixed to the shaft.

Figure 2A:
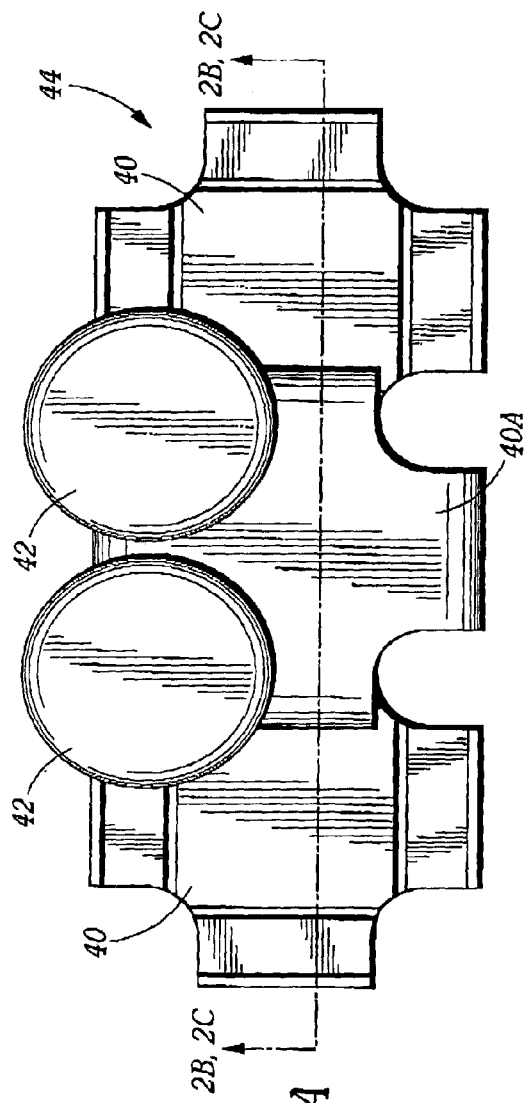
FIG. 2A is a plan view of a portion of the non-textile fabric formed by the process of the present invention, showing a legs-up plate element, a legs-down plate element and a rivet.
Figure 2B:
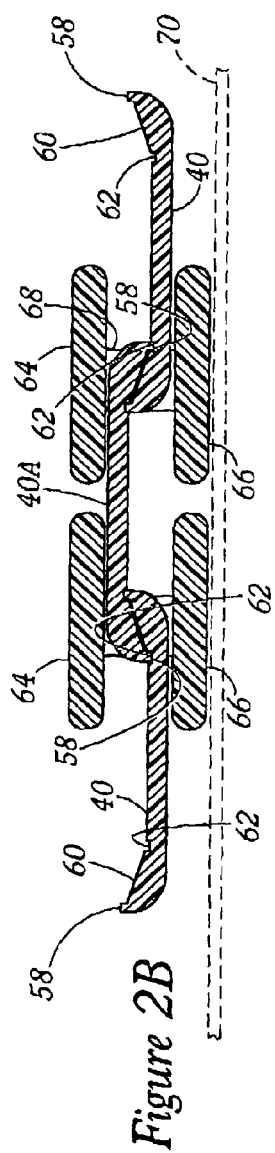
FIG. 2B is a section view taken along line 2B-2B in FIG. 2A.
Figure 2C:
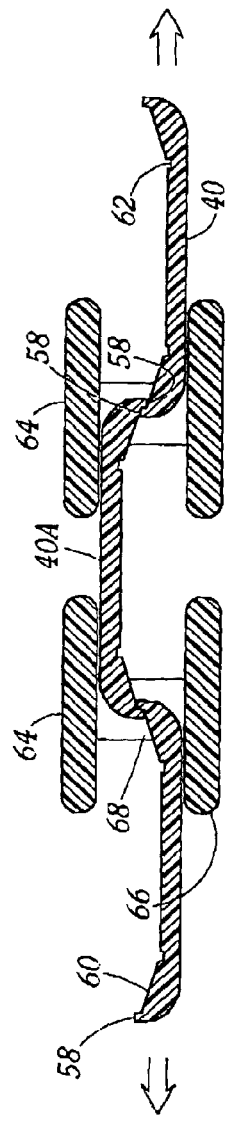
FIG. 2C is a representative section view similar to that in FIG. 2B, with the plate elements laterally expanded relative to the rivet.
Figure 3:
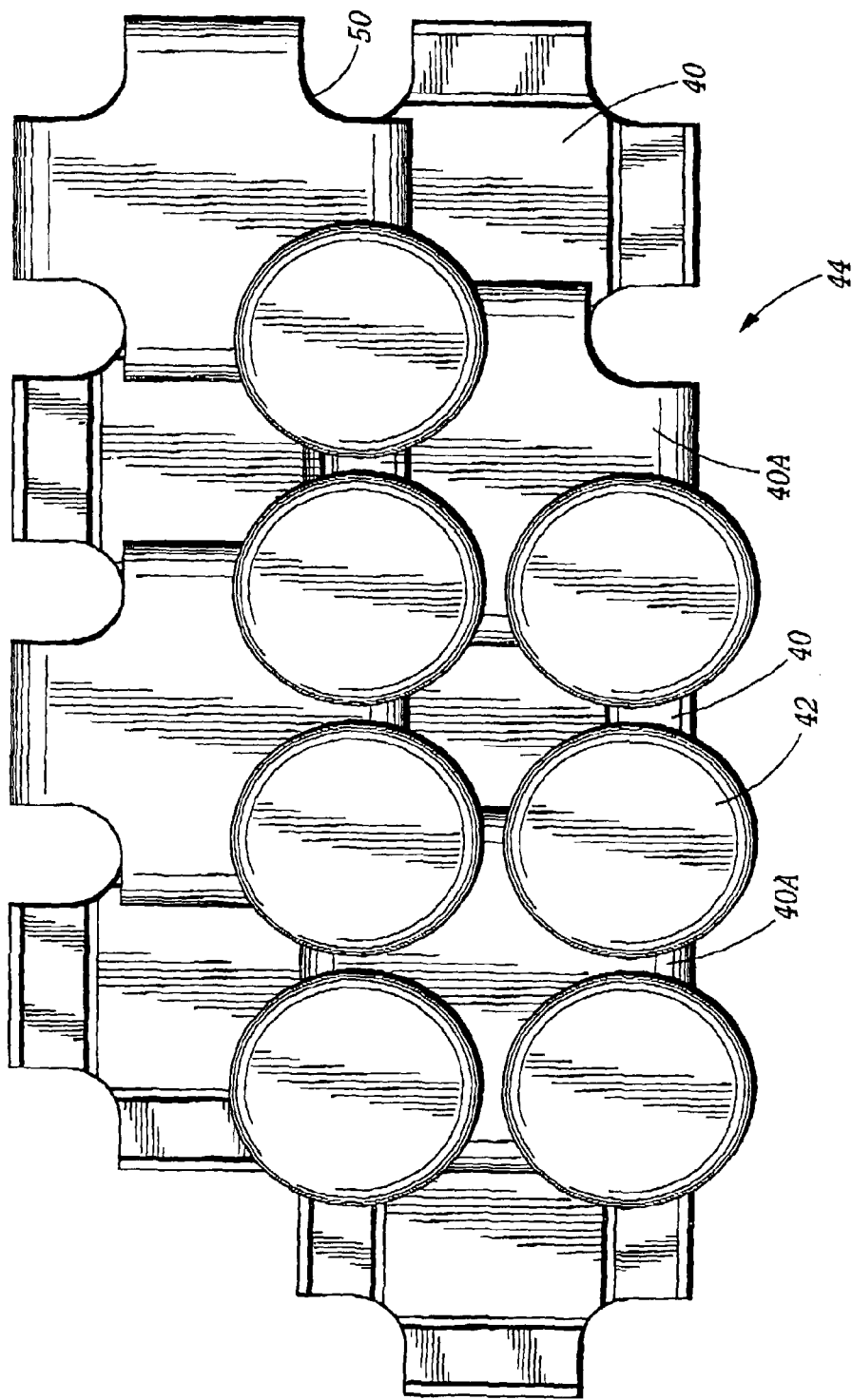
FIG. 3 is a larger scale plan view of a portion of the non-textile fabric formed by the process of the present invention.

A section of the assembled structure of the non-textile fabric 44 is shown in FIGS. 2A-C. FIG. 2A shows a plan view of the non-textile fabric 44, with three plates 40 held in position by two rivets 42. The two outer plates are in the "legs-up" orientation, and the shaded middle plate is in the "legs down" position. Each rivet is positioned so that its shaft 58 extends through the aligned cutouts 50 of each adjacent plate. The opposing heads 64 and 66 of the rivet define the limits of the vertical (with respect to FIG. 2B) motion of the plates 40. In this position, the adjacent plates 40 are interlocked together with their respective engagement structures in engagement. See FIG. 2B. Briefly, in the engaged position, the ridge 58 of the top ("legs down") plate is received in the groove 62 of the bottom ("legs up") plate. The cam surfaces 60 of each plate 40 are resting against one another, and the ridge 58 of the bottom plate is positioned in the groove 62 formed in the top plate. As will be described below, this is the position the plates will be in when the "legs down" plate is formed in the inventive process. Several plates can be attached to one another in this manner, with the engagement structure on all four sides engaging a corresponding engagement structure of an adjacent plate. Rivets 42 are positioned through the cut outs 50 at the corners of the plates 40 to insure that the engagement structures remain in engagement and keep the plates from separating. See FIG. 3.

The engagement structure allows the plates to move to some extent with respect to one another and allow the non-textile fabric to bend. The more the plates 40 can move with respect to one another, the more the non-textile fabric can bend (e.g. have a smaller radius of curvature), flex and twist. As can be seen, the benefits of a non-textile fabric such as this are significant. A hard, durable outer surface is provided that protects the underlying surface 70 (such as fabric in a piece of luggage) from damage due to sharp impacts, and disperses those impacts over a larger surface area. In addition, this tough armor-like surface is also flexible and lightweight.

FIG. 2C shows the embodiment of the non-textile fabric 44 of FIGS. 2A and B. Here the shaft 68 of the rivet 42 is somewhat extendable and resilient. With an extensible shaft, on lateral stretching of the non-textile fabric, such as when bending, twisting, or being pulled directly in a lateral direction, the mutually engaging cam surfaces 60 or ramps ride up on one another. This creates a tensile force on the shaft 68 of the rivets holding these mutually sliding plates together, and stretches the shaft slightly. The plates 40 are thus at a spaced-apart position, as shown in FIG. 2C. The shafts of the rivets, in turn, apply a compressive force to the plates and, due to the geometries of the cam surfaces 60, tend to pull the plates toward one another, thus moving the plates towards their unstretched positions. This compressive/tensile force balance effect makes the non-textile fabric seem resilient (laterally stretchable) as well as flexible. Thus, it is likely to look, feel and perform like a textile and provide an extremely hard and durable surface simultaneously.

Other plate structures are contemplated to work adequately in forming the non-textile fabric. Examples of these alternative plate structures are shown in FIGS. 9-18. These alternative plate structures are made and assembled (direct formed) in a manner similar to that described below for the plate structures shown in FIGS. 1A-B, 2A-C, and FIG. 3.

Each plate and rivet is made from a polymer material that is subject to the solid phase forming process. Conventional plastic pellets are preferred to other forms of feed stock materials, all other things being equal. The use of conventional plastic pellets can give the inventive process great versatility and economy, simplifies material handling and also assures minimal thermal degradation of the feedstock. Of course, if the particular thermoplastic chosen does not lend itself to pelletizing, such as ultra-high molecular weight polyethylene (UHDPE), briquetting is also an acceptable starter stock.

The material for the top and bottom plates could be identical, although it may be desirable to use a different plastic material for the plate that is positioned on the exterior of the final product. This may be important because the outer plate may be subject to different physical conditions and stresses (e.g. abrasion, etc.) than the inner plate. The material for the exterior plate thus should be selected appropriately to provide at least a scuff resistant polymer for those plates only. Color and texture, among other characteristics, can also be taken in to account in the selection of the polymer for forming the exterior plates. Also, to help prevent any undesirable or unwanted welding of the legs down plates to the legs up plates during the processing when the legs up is used as a portion of the mold cavity for forming the legs down plate, the legs down plates should be formed of a polymer having a higher melting point, or one incompatible with the polymer of the legs up plates. This is described in more detail below.

The rivet materials could again be similar polymers to those of the plates, or another polymer with characteristics particular to the processing and functional peculiarities of the rivets.

The inventive process is best explained with reference to a preferred manufacturing apparatus which includes at least two assembly rollers having a nip line (line of contact) between the at least two rollers. In general, the outer surface of each roller is a work surface, and at selected locations this work surface receives the plastic pellets. The plastic pellets are generally received, retained, transported, formed, and released from the work surface of each roller. The motion of the rollers is preferably computer controlled for precision movement with respect to one another and other equipment. Each roller is generally hollow, and contains internal apparatus, as described below, for receiving, holding, forming and manipulating the polymer pellets.

Figure 4A:
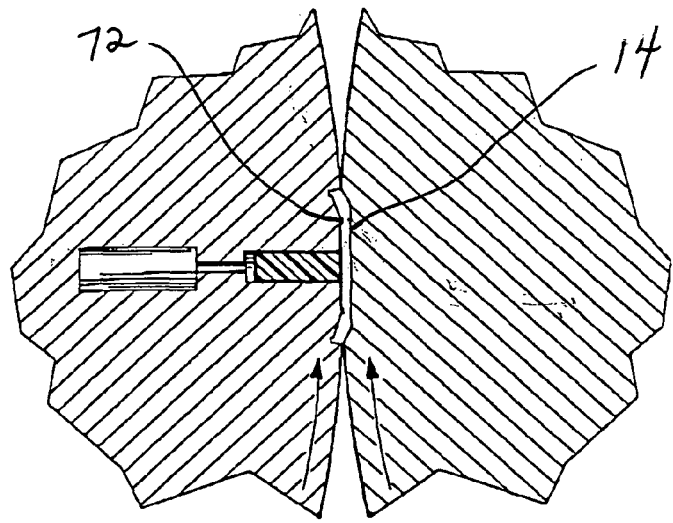
FIGS. 4A-C are representational section views showing the solid phase forming steps used to make the legs-up element of the non-textile fabric, such steps making up a portion of the process of the present invention.

The solid phase forming process utilized in the inventive direct forming process is described in FIGS. 4A, B, and C. The basic direct-forming steps are described here to facilitate the description of the entire process below. The basic processing step occurs at the nip between adjacent rollers. Each roller surface forms a portion of a mold cavity 72, 74 such that when positioned in alignment together along the nip between the rollers, forms a complete mold cavity. (See FIG. 4A.) A recess 76 is formed adjacent to the cavity mold, generally radially-inward from the cavity mold, to receive a polymer pellet 78 from an earlier step in the direct forming process. The volume of the polymer pellet 78 and the mold cavity are generally the same. A striker 80, controlled by an actuator 82, is positioned adjacent the recess 76 to impact the pellet 78 and force it into the mold cavity to take on the shape of the mold cavity.

In FIG. 4A, the mold cavity portions on rollers A and B are aligned along the nip to form a complete mold cavity. The mold cavity is shaped to form a plate 40 similar to that shown in FIG. 1. The pellet 78 is positioned in the recess 76, with the striker head 84 engaging the pellet 78. Nearly instantaneously to the alignment of the two cavities 72 and 74, the actuator 82 is caused to impact the pellet 78 and force it into the mold cavity. See FIG. B. The speed of the impact by the striker 80, along with the physical characteristics of the pellet 78, and the possible heated condition of the pellet, causes the pellet 78 to enter the mold cavity, deform, and adapt the shape of the mold cavity. The striker 80 motion terminates at the sidewall of the mold cavity, in this example, to form part of the mold cavity. This step is the solid phase forming of the pellet 78 into the element 40, discussed in greater detail below.

Figure 4B:
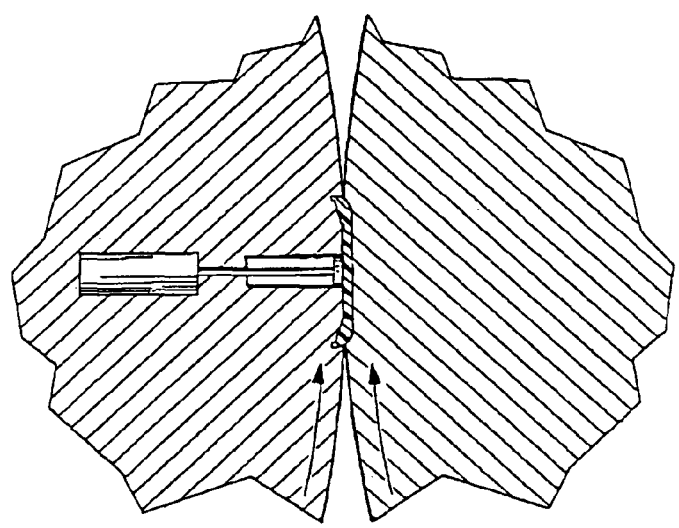
Figure 4C:
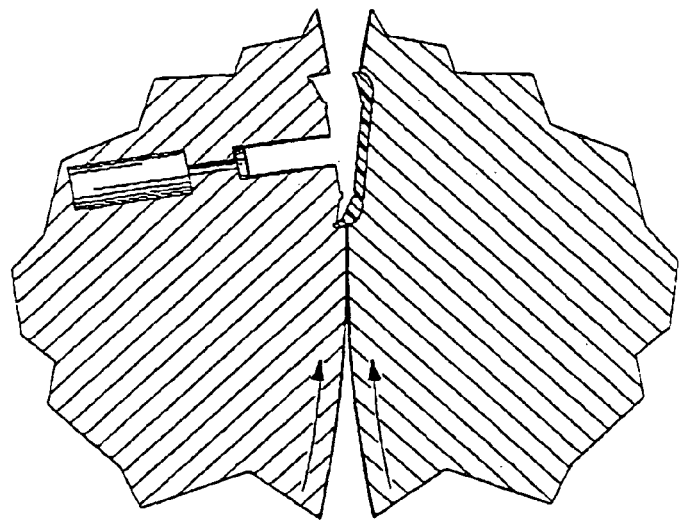

As the rollers A and B continue to rotate with respect to one another, and in this example in opposite directions, the element 40 is retained in the mold cavity portion of roller B by some means, such as mechanical fit or vacuum pressure. See FIG. 4C. The striker 80 can be used to expel the element from the portion of the mold cavity on roller A if required. The striker 80 then retracts into the recess 76, in preparation for receiving another pellet 78. The element 40 is carried along on roller B to the next forming position.

In this basic example of the process, it is clear that the solid phase forming process in combination with the continuous motion of the rollers provide a very advantageous method of forming and transporting the formed part. Since the use of rollers in high-speed production and manufacturing processes is very well developed, the control systems required for the precisely-timed forming step are known in the art. This process produces very little waste and has a high production rate.

In particular, the embodiment first described herein, as shown in FIG. 5, includes three fairly large and one relatively small, serially interengaging rollers 1, 2, 3, and 4, respectively. Each roller turns at the same speed but in a direction opposite that of the adjacent roller. A nip region is formed along the tangential line of contact between the adjacent rollers. The direct forming operation is performed in this nip region between each roller to form a line or rank of elements in mold cavities formed along that nip region. In FIG. 5, there is a nip region between rollers 1 and 2, between rollers 2 and 3, and between rollers 3 and 4.

Each of these rollers has an outer perimeter surface 86 that include dimples or cavities making up one of the two portions of the miniature clamshell type mold cavities to form the plates 40 or rivets 42 that make up the non-textile fabric elements. These mold halves come together and form closed or complete mold cavities at the nip between rollers and are then ready to receive the flowable thermoplastic material from the pellet, as described above with regard to FIGS. 4A-C. Each roller differs from the others in that the internal structures within the rollers, and shapes of the dimples or cavities are specific to the operations performed by that roller. The axial dimension of these rollers has no real limit, but it should at least exceed the width of the largest non-textile fabric article to be made. In the case of luggage then, the axial dimension over which elements may be formed and assembled would be in the range of 100 centimeters.

In the exemplary process, in an overview, one of the elements is formed in the "legs-up" position at the nip between rollers 1 and 2. A second of the elements is formed in the "legs-down" position at the nip between rollers 2 and 3. This "legs-down" element is formed in engagement with the "legs-up" element as part of the direct-forming process to interengage the elements together during processing. The rivet is then formed at the nip between rollers 3 and 4 to keep the interengaged plate elements together. The non-textile fabric is then extracted from the process in a fully assembled condition at the off-feed from between rollers 3 and 4.

Each of rollers 1, 2 and 3 can have several similar stages or features that facilitate the direct forming process. Roller 1 has six basic stages associated therewith. The first stage 88 includes the striker structure 80 mounted inside the roller at the inner surface of the outer wall 86. The striker, as noted above, is positioned and controlled to interact with the pellet receiving recess 76. Each striker 80 corresponds to a pellet-receiving recess 76, and can be actuated between a retracted and fully extended position, and any position therebetween.

The striker 80 can be solenoid operated, for example, and must have several characteristics in addition to the ability to position the striker head as mentioned above. In particular, the striker and its solenoid (actuator 82) must fit within the roller in a relatively small space. Since the plates to be made on each roller are likely arrayed on 4 mm centers, a solenoid and its connections must occupy less than an approximate 8 mm diameter cylindrical space within the body of each cylinder. This is easily accomplished in view of the miniaturization strides made in dot matrix and inkjet printer heads. If more room for the striker mechanism 80 is needed than is available within the cylinder, belts made up of linked arrays of strikers and cavities could be used to give almost unlimited space for such mechanisms.

The striker actuator 82 must also move the striker head 84 (ideally, but not limited to, one striker actuator per pellet) at considerable speed and force, adequate to plastically deform the pellet or pellets into the mold cavities. The striker actuator 82 must complete its molding stroke almost instantaneously, since the mutually engaging rollers will be rapidly rotating to produce an adequate flow of completed non-textile fabric shapes. Thus, the molding stroke must be very brief in view of the relatively small time the mold cavities will be aligned at the nip in the rollers.

Lastly, the striker assemblies must be easily operated in various combinations and arrays in response to computer operated control signals. Again, past development of dot matrix printers, ink jet printers, and the like in the past places all of these mechanisms easily at the disposal of one of ordinary skill, once the application of these technologies has been disclosed as above. One such structure is disclosed in U.S. Pat. No. 5,126,618, which is hereby incorporated by reference in its entirety.

Returning to FIG. 4, the strikers 80 in roller 1 are positioned (e.g. the striker heads 84 are positioned by the controller) to be flush with the mold cavity wall to exclude a pellet 78 and thus not make a plate, or withdrawn into the recess 76 to receive the pellet therein if a plate 40 is to be formed in this mold cavity. In this way, pellets are only positioned in the recesses 76 intended to receive pellets 78 to form a predetermined shape of non-textile fabric.

The second stage is a pellet hopper 90 positioned and controlled to selectively apply pellets 78 to the outer surface 86 of the roller. The pellets 78 are applied in an orientation to allow them to be received in the recesses 76 as desired. The pellet hopper 90 is preferably positioned just downstream of the nip between rollers 1 and 2. While FIG. 5 shows a hopper or the like, it may be more desirable to use electrostatic placement, fluidized bed distribution, or vacuum depositing to position a pellet 78 in each of the appropriate recesses 76. Fluidized bed plus vacuum (a small vacuum channel in the recess exposed by the withdrawn striker head) would assure complete filling of all the appropriate recesses 76. Another option is to selectively position the pellets 78 in the desired recesses from within the roller. The pellets 78 could be positioned in front of a retracted striker head 84, and pushed into the recess 76 by the striker 80. This would alleviate any problems associated with the mass distribution of pellets 78 to the outer surface 86 of the roller, and would eliminate the need to remove excess pellets 78. The recesses 76 can be sized to receive only one pellet 78, or could be sized to receive several pellets. As shown, the recess 76 is shaped to closely receive one pellet 78, however, it is contemplated that the recess 76 could be shaped to receive one pellet 78 in a loose manner and not be closely received by the recess 76. Also, it is contemplated that the pellet 78 could be inserted into the recess from inside the roller through an opening in the sidewall of the recess 76. This opening could be selectively blocked by the striker 80 if desired to keep a pellet from being positioned in the recess 76.

The third stage is a pellet placement roller 92 that engages the outer surface 86 of roller 1 (or its respective roller) to assist in positioning the pellets 78 in their respective recesses 76. The pellet placement roller 92 preferably has a cushioned outer surface to gently urge the pellets into their respective recesses 76 without accidentally performing any solid-phase forming, or otherwise deforming the pellet shape. At this stage, soft roller or the like would push any captured pellet almost flush with the recess 76, assuring that the pellet will remain in place until forged or solid-phase molded into its respective mold cavity.

The fourth stage is a pellet remover station 94 to remove those excess pellets not properly positioned in their respective recesses 76. This pellet remover 94 can operate by contact (such as a scraper) or non-contact (such as by vacuum or the like). The removed pellets 78 can be recycled.

The fifth stage is a heat source 96, either external or internal to the roller, for selective temperature conditioning of the pellets 78 prior to the solid-phase forming step.

The heat source 96 can be electric, convection, radiation, or any other heating technique known or available for such an operation. For solid phase molding, much of the energy for shaping the pellet 78 or slug into a final shape comes from the instantaneous forging forces dissipated in the preform or slug during the operation. However, it is anticipated that each of the pellets should be at a controlled temperature prior to forging so that optimum molding can occur. The fifth feature shows radiant heaters bathing the pellets held in the recesses prior to forging. Other heating systems are possible including temperature controlling the cylinder itself, or heating the pellets in a fluidized bed just prior to placement. The heating stage is discussed in more detail below.

Each roller preferably has similar features or stages associated therewith to facilitate the particular solid phase forming process with which that roller is associated. While each of these roller features may not be necessary for optimally sized pellets, the use of cintered briquettes or loose powders would likely involve them all.

In greater detail, FIG. 5 is an end view diagramming the exemplary molding/assembly process and the equipment required for performing the process of the present invention. The processed materials move generally from left to right as shown. The fourth roller shown at the lower right of the drawing can be a simple anvil roller with appropriate cavities to aid in forming and/or setting the rivets 42.

Figure 6:
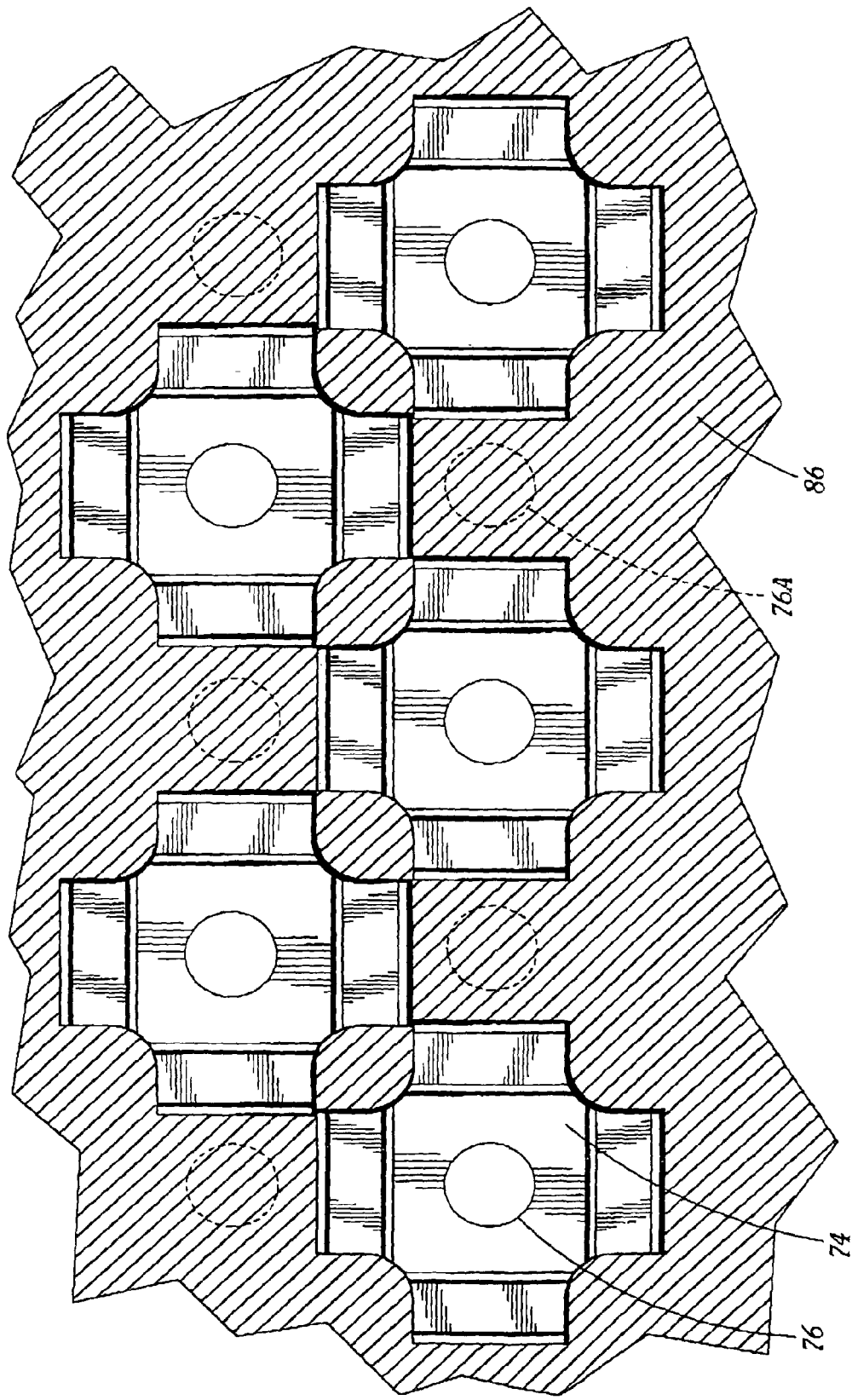
FIG. 6 shows a portion of the work surface of the first roller, including the legs-up mold cavities and the recesses for holding the pellets.

All the rollers (with the possible exception of anvil roller 4) have hundreds of small recesses 76 for receiving thermoplastic pellets 78. On roller 1, as shown in FIGS. 4A, B, C, and 6, each one of these recesses 76 is centered in a dimple or mold cavity portion 74 formed in the outer surface 86 of the roller 1 (in this example). See FIG. 6. Each dimple or mold cavity portion 74 is about half of the miniature mold cavity needed to form a plate element in the "legs-up" position. For roller 1, these cavities are shaped to form the plate with the four "legs" used to loosely link each plate with the overlapping plates in the assembled non-textile fabric. The plates formed at the nip between rollers 1 and 2 are in the "legs up" position because these plates, once formed, are vacuum transferred to roller 2 with the legs extending radially outwardly away from roller 2. This orientation is in preparation for forming the second plate in the "legs-down" configuration at the nip between rollers 2 and 3.

The pellet receiving recess 76, as can be seen from the side in FIG. 4A, is preferably a right circular cylinder to snugly receive the small thermoplastic pellets 78 from the compounder. The circular face of the striker head 84 form the bottom circular end of this recess. This striker head 84, as mentioned above, is operated by an electromagnetic or piezoelectric solenoid, or the like. This solenoid can position the face of the striker head 84 well within the recess, leaving a space for one, two or more such pellets. The solenoid can also position the face of the striker head 84 at or beyond the opening to the recess 76 and extend in to the mold cavity 74 to exclude any pellets 78 from being deposited there. The strikers could also be operated as extraction pins to release the just molded plate 40 or rivet 42 from its respective mold cavity after formation.

At the beginning of the process, pellets 78 are positioned on the surface 86 of roller 1 by the pellet hopper 90. The pellets 78 are urged into position by the pellet-positioning roller 92. The excess pellets 78 are removed by the pellet removal device 94. The pellets are then heat-conditioned at the heating stage 96. The solid phase forming process then occurs at the nip between rollers 1 and 2 to form the "legs-up" plate elements. This step was described with respect to FIG. 4 above. The "legs-up" plate elements are formed and remain on roller 2, arrayed in approximately the same relative position in which they were formed, such as is shown at FIG. 5A. Roller 1 continues its rotation through all of the stages continuously to allow for efficient and continuous processing of the non-textile fabric.

At roller 2, continuing with FIG. 5, the processing continues. Roller 2 has pellet recesses 76A formed in the mold cavities for the "legs-down" element, which are positioned between the arrayed legs-up plate elements positioned on the surface of roller 2. See the recesses 76A formed in dash on FIGS. 5A and 6 to indicate the location of the pellet recesses 76A on roller 2 with respect to the "legs-up" elements. Thus, the pellets 78 are deposited on roller 2 between the location of the formation of the "legs-up" plate elements 40. The pellets 78 are preferably positioned, the excess pellets removed, and the remaining pellets heated (similar to the stages on roller 1) prior to the forming process at the nip between rollers 2 and 3.

Alternatively, the pellet deposit (90A), positioning (92A), excess removal (94A), and heating (96A) can take place before the formation of the legs-up plates at the nip between rollers 1 and 2, if so desired, as shown in FIG. 5 at the bottom of roller 2. It is contemplated that each of the steps associated with the placement, positioning, and conditioning of the pellets on the outer surface 86 of any of the rollers can be performed in any order and location as is beneficial for the solid phase forming process.

At the nip between rollers 2 and 3 the "legs-down" plate elements are formed preferably by the solid phase forming process. See FIGS. 7A and B. In this forming step, the surface of one of the leg portions of the "legs-up" plate element, i.e, the first inter-engaging surfaces, (to distinguish such from substantially similar surfaces of the other leg portions, i.e. the other inter-engaging surfaces of each "legs-up" plate element which may engage other elements) acts as part of the mold cavity for forming an adjacent "legs-down" element, as described in further detail below.

Figure 7A:
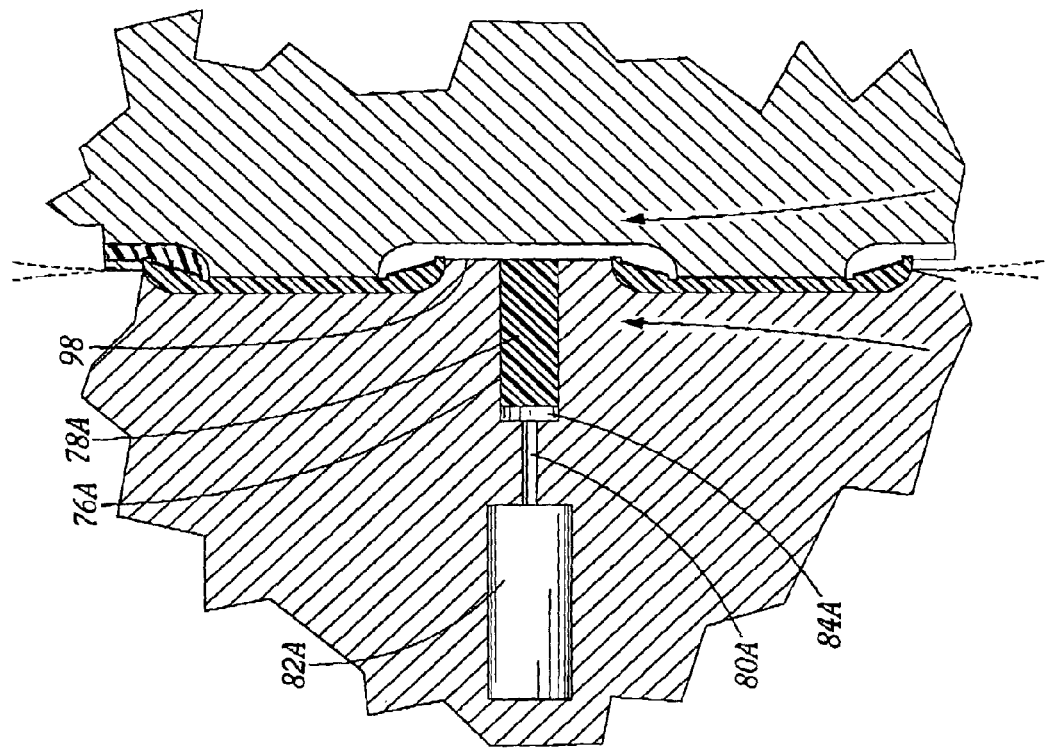
FIGS. 7A and B are representational section views showing the solid phase forming steps for forming the legs-down element of the non-textile fabric, such steps making up a portion of the process of the present invention.

Referring to FIG. 7A, the pellet 78A is shown in the recess 76A, with the striker head in the retracted position and engaged with the rear end of the pellet 78A. The partial mold cavities 98 and 100 formed partially in rollers 2 and 3, respectively, are aligned to form the complete mold cavity at the nip between rollers 2 and 3. See FIG. 7A. The mold cavity for forming the "legs-down" plate element is defined in part by the surface of rollers 2, the surface of roller 3, and a portion of the "legs-up" element. This mold-cavity formation allows substantially all of the inter-engaging surfaces of the "legs-down" plate element to be formed to and fit precisely with substantially all of the first inter-engaging surfaces of the "legs-up" plate element, thus creating an inter-engaging or connected structure during forming without need of separate assembly of individual pails.

Figure 7B:
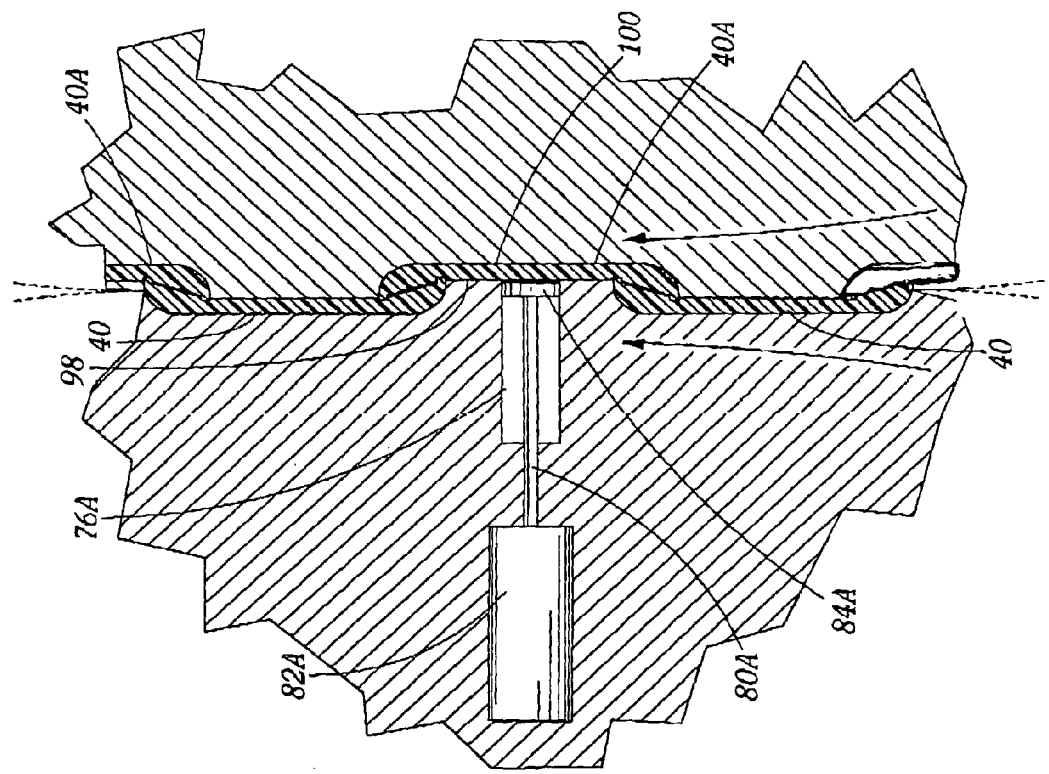

Once the complete mold cavity is formed by the alignment of the mold cavity portions 98 and 100 on rollers 2 and 3, respectively, the striker 80A is actuated to force the pellet 78A into the mold cavity and adapt the shape of the complete mold cavity. See FIG. 7B. This solid phase forming step includes the formation of the inter-engaged ridge and slot formation of the embodiment of the element 40 described above. The striker head 84A is shown in its extended position to form a portion of the back surface of the mold cavity in FIG. 7B.

The structure of the "legs-down" plate elements 40A formed to engage with the "legs-up" elements 40 at the nip between rollers 2 and 3 is shown in FIG. 5B. This structure leaves only a small, generally circular hole formed between and through the array of plate elements 40 and 40A between the four overlapping legs of adjacent plate elements. These circular spaces will help position and mold the rivets 42 at the nip between rollers 3 and 4. The mutually engaging legs of the plates 40 and 40A have a shape that meets luggage construction needs in a preferred way.

As rollers 2 and 3 move, the just-formed "legs-down" 40A and the existing "legs-up" 40 plate elements disengage from roller 2 and adhere to roller 3, such as by vacuum force on the "legs-down" plate elements. The overlapping plates will likely hold together adequately for transport on roller 3 to the next processing step even without inserted or inserted and set rivets. This is because the intimate mating of mutually molded legs will adhere to one another via VanderWals forces.

The use of part of the previously formed legs-up plate elements 40 as a portion of the mold cavity for forming the "legs-down" plate element 40A is very advantageous. It allows for the forming of interengaged (connected) plate elements without requiring the separate plate elements to be manufactured separately and then assembled. It is important for the legs-down 40A and legs-up 40 plate elements to remain separate elements and not become a single fused element during this forming step. To insure the two plates do not fuse together during the processing step, it is important for the legs-up plate element 40 to be formed of a polymer that includes properties that resist permanent fusing with the legs-down plate element 40A during the formation of the legs-down plate element. These properties could include that the legs-down plate element 40A is formed of a polymer that has a lower melting temperature than the legs-up plate element 40. This would result in the legs-down element 40A being formed at a temperature where the legs-up element 40 is sufficiently solid and not in a softened state. In addition, the surface characteristics of the legs-up element 40 could be manipulated (hardened or lubricated) after formation and prior to its use in the molding of the legs-down plate element 40A to make it resist bonding to the legs-down plate element 40A. The selection of the polymers for the formation of each of the two plate elements should consider this requirement, and the processing parameters (temperature, speed, etc.) should also factor in this requirement.

For certain non-textile fabric applications, for example in relatively rigid luggage panel constructions, some mutual melting and non-permanent fusing between the previously formed legs-up plates 40 and the just formed legs-down plates 40A may be tolerated. The extra stiffness derived from the occasional permanent weld joint resulting from such mutual melting will likely break loose during the subsequent assembly steps or ordinary consumer use. Processing speeds should be set at a nominal rate so that such plate-to-plate welds are generally rare. The amount of excess sensible heat left in the legs-up plates 40 and imparted to or generated in the legs-down plates 40A should be controllable and minimal due to the solid phase forming techniques discussed herein. The processes should be able to be controlled at precise enough levels to allow the use of the same type of polymer for each element.

Referring back to FIG. 5, the arrays of overlapping plates now pass to the surface 86 of roller 3. The outer surface of roller 3 forms recesses 76B for receiving the pellets 78B, and a partial mold cavity 102, both used in the rivet 42 formation step. The outer surface of roller 4 forms partial mold cavities 104 also for the formation of the rivets 42. The pellet recesses 76B are formed in the circular spaces left between the corners of adjacent plate elements. The mold cavities 102 and 104 overlap the edges of the circular recesses and engage the top surfaces of both legs-up 40 and legs-down 40A plate elements in order to hold the adjacent plate elements together.

The stages of pellet deposition 90, positioning 92, excess removal 94, and heat treatment 96 are performed on roller 3 to prepare for molding rivets in the appropriate cylindrical holes left between each four overlapping legs of adjacent legs-up 40 and legs-down 40A plate elements. This rivet-forming process, shown in FIGS. 8A and B, is overall the same as outlined earlier for the formation of the legs-up 40 and legs-down 40A plate elements. In this formation step at the nip between rollers 3 and 4, for the process and element structure, roller 4 has only partial mold recesses 104 formed thereon for forming the heads of the rivets.

Both the legs-up 40 and legs-down 40A plate elements form part of the mold cavity corresponding to the shaft 69 of the rivet 42. As with the requirements for the pellet material qualities with respect to the formation of the legs-down plate elements 40A using the legs-up plate elements 40 as part of the mold cavity, it is important that the polymer used to form the rivets 42 does not permanently fuse with either the legs-down 40A or legs-up 40B plate elements during or after the formation step. Again selection of the rivet-forming polymer and its material characteristics should consider these criteria (e.g. the temperature of the plate elements, the temperature of the rivet-forming pellets, etc.)

FIG. 8A shows the pellet in the recess and the striker in its retracted position in engagement with the rear end of the pellet. As rollers 3 and 4 meet at the nip between them, the complete mold cavity is formed. Nearly instantaneously, the striker is actuated to cause the pellet to deform into the mold recess and adapt the shape of the mold recess. See FIG. 8B. Again, the rivet in its final formed embodiment, is not fused to either of the plate elements. The rivets keep the inter-engaged plate elements from separating by limiting the distance the plates can move away from each other. The lateral motion of the plates, relative to one another, is controlled by the engagement of the legs formed on the respective plate elements. Ideally, the polymer used in the rivet allows for some resilience to allow a greater lateral movement of the plates, as explained above. The fully-formed inter-engaged non-textile fabric material is shown in FIGS. 2A, 2B, 2C, 3, and 5C as produced in the instant direct-forming process described herein.

The final product exits from between rollers 3 and 4 and is subsequently used as the outer surface of objects, such as luggage. The completed non-textile fabric shapes roll off roller 3, ready for use or final assembly. FIG. 5C shows a plan view of a small section of the completed fabric.

It is contemplated that other devices can be utilized to facilitate the manufacture of the non-textile fabric sheet material. For instance, if rollers are found to be inconvenient for any reasons, continuous belts or continuous link-belts are believed to be appropriate for such processing technique. The use of a continuous belt or link-belt has the benefit of providing more space for the striker structure if needed, and increased time during which mold halves can remain aligned for the molding operations.

It is also contemplated that the rollers used in the inventive process denoted herein do not have to be cylindrical. It may be determined that a roller made up of short flat sections extending lengthwise across the roller is beneficial, or that some other type of segmented roller structure is preferred. Thus, the use of the term "roller" herein is indicative of a structure that allows relatively continuous processing, and is inclusive of continuous belt, segmented rollers, and the like structures.

Also, the direct forming process of the present invention, including the operation of the surface stages, the roller, the striker, and any other associated parameter including roller spacing or relative movement, is controlled by a computer having a microprocessor and associated software (the "control system"). The control system is believed to be enabled by the currently available processing control systems.

Several different types of polymers can be used for the inventive direct forming process. For instance, ABS, HDPE, PP, UHMWPE and PC are believed to be adequate polymers for use in the instant process to direct-form non-textile fabrics. During the solid-phase forming steps of the inventive process, the pellets are heated to a temperature above the softening point of the particular polymer and below its melting point. To the extent this temperature is not obtained solely by the physical deformation of the pellet during the solid phase formation process, it can be supplemented by an external heat source as described above. The article "Part performance is improved via solid-phase forming," Modern Plastics, December 1985 is hereby incorporated by reference in its entirety. Almost any polymer that meets the criteria and characteristics required of the instant inventive process is suitable.

Another embodiment of the non-textile fabric able to be direct formed by the inventive process disclosed herein is shown in FIGS. 9-14. This embodiment includes a configuration of relatively rigid elements 110 and 112 that can be assembled to form a flexible non-textile fabric. There is a barbed element 110 (having a headed, barbed or engagement end or portion along its preferably four edges) and a socket element 112 (having a corresponding invagination, receiver or socket along at least one of its corresponding four edges). The elements mechanically link with one another in a tile-like configuration. The interconnected barbs and sockets act as mechanical connections that can pivot relative to one another and slide slightly to give an overall flexible connection between the arrayed barbed and socketed elements. The elements are generally flat, having a central web portion or main body 114 constituting most of the surfaces of each of the elements to form an overall plate configuration. This web portion extends to the edges which are defined by either sockets or barbed edges as described above.

Unlike the non-textile fabric elements discussed above, the subject invention does not require a second headed element (e.g. a rivet) to hold the elements together. Also, unlike the above-described embodiment, the elements are directly connected to one another rather than merely resting on one another and relying on the rivet element to keep the overlapping hooked plates from separating too far and becoming disengaged.

Figures 9, 10:
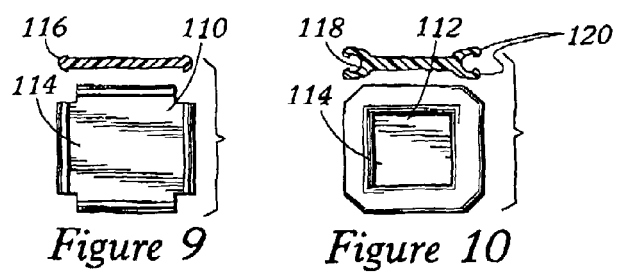
FIG. 9 shows a top plan view and typical section of an alternative embodiment of a plate element having barbed edges used in forming the non-textile fabric of the present invention.
FIG. 10 shows a top plan view and typical section of an alternative embodiment of a plate element having recessed edges used in forming the non-textile fabric of the present invention.
Figure 10A:
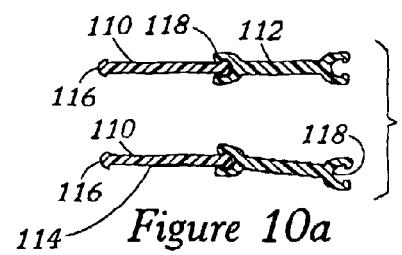
FIG. 10A is a representative section showing the engagement of the plate having the barbed edges and the plate having the recessed edges of the alternative embodiment shown in FIGS. 9 and 10.
Figure 11:
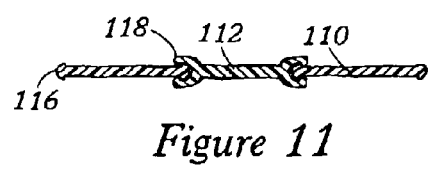
FIG. 11 shows a portion of the non-textile fabric made up of the plate elements of the alternative embodiment of FIGS. 9 and 10.
Figure 12:
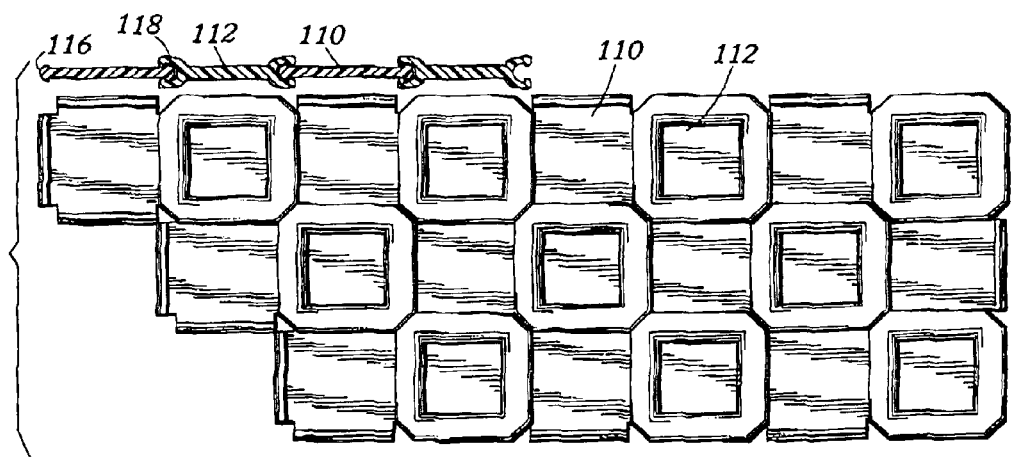
FIG. 12 shows a larger portion of the non-textile fabric made up of the plate elements of the alternative embodiment of FIGS. 9 and 10.
Figure 13:
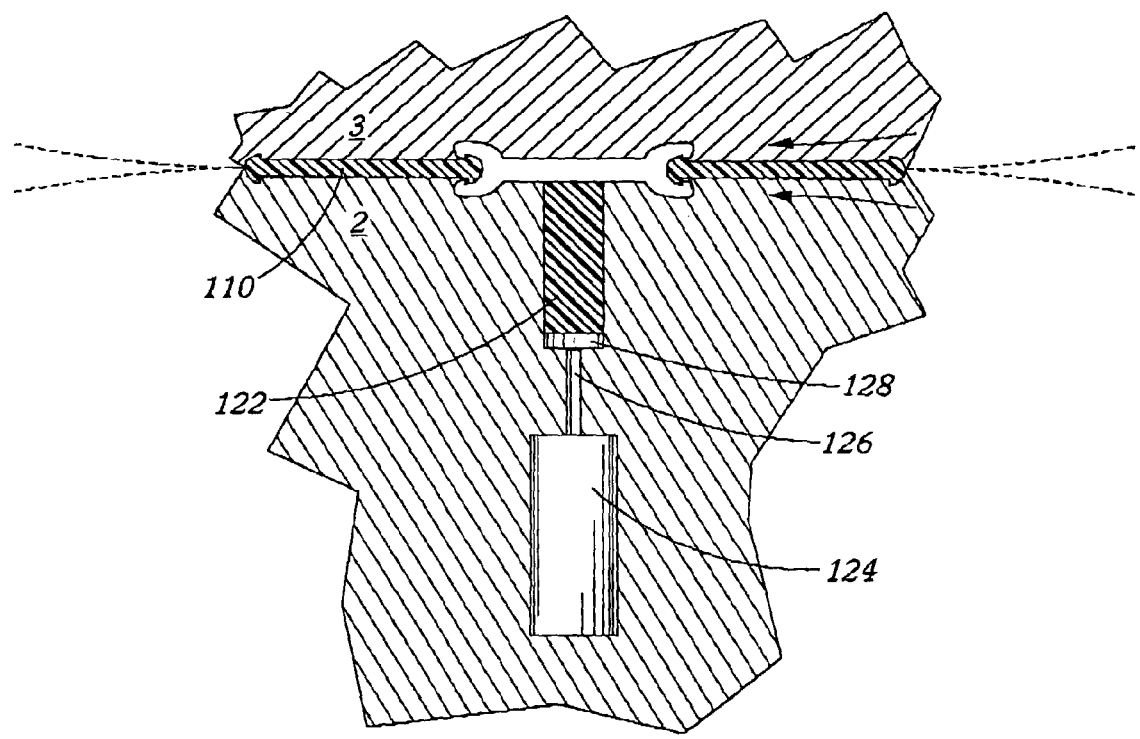
FIG. 13 is a representative section showing the solid phase forming step for forming the plate element of FIG. 10 having recessed edges using the plate element having barbed edges as a portion of the mold cavity.

FIG. 9 shows the general plan view and a cross-sectional view of the barbed plate element 110. FIGS. 10 and 10A show a similar plan view and cross-sectional shape of the socketed element 112. FIG. 11 shows a cross-section through a linked set of two barbed plates 110 and a centrally located socketed plate 112. FIG. 12 shows an array of elements according to the instant invention with the barbed 110 and socketed 112 elements forming a checker board pattern. FIG. 13 shows this embodiment being formed at the nip between rollers 2 and 3.

In FIGS. 9 and 10, the elements are generally square in shape (although other shapes such rectangular, triangular, etc. may be possible). Along each edge of these plates are molded-in otherwise defined mechanical interconnections. In the barbed plate 110, as shown in FIG. 9, all four edges include an elongated enlarged portion forming a barb 116, because this enlarged portion links to the web of the plate via a sharply defined edge. This edge, as will be detailed, prevents the barb 116 (once seated in a correspondingly shaped socket of the plate of FIG. 10, for example), from withdrawing when the plates are subjected to tensile forces or bending forces. Preferably, this barbed plate is formed at solid phase forming temperatures directly from a temperature conditioned preform, most preferably a reactor or polymer compounded pellet. This direct forming process is described above. Thus, each plate and the details of the barb and socket portions are extremely small.

Referring to FIG. 10, one can see that the socket 118 along each edge of this plate element 112 is formed by two symmetrically and inwardly facing hooked portions 120 that integrally connect to the central web of the plate in the solid phase forming or molding operation. FIG. 10A shows how this socket portion 118 is sized to loosely receive the barbed portion 116, yet the mutually engaging hooked portions 120 prevent withdrawal of the thus movably interconnected parts. The slight angular deflection illustrated in FIG. 10A can result in a perceptible flexibility of the overall non-textile fabric, especially when each plate element is made in relatively small scale. In particular, it is anticipated that the major dimension of each of the plate like elements could have a maximum dimension of between 3 and 5 millimeters for example.

FIG. 11 shows how a series of alternating barbed 110 and socketed 112 non-textile fabric elements can be assembled. Overall FIG. 12 shows how these alternative forms of plates can be assembled in a checker board pattern. Note in each of the two configurations the corner intersections of the edges are cut away in a particular manner so that the corresponding portions of the adjacent plates do not overlap and prevent or hinder flexing of the assembled product if such flexing is desired. In particular, the barbed plate 110 has triangular indentations at each corner that in effect remove the barbed head from any chance of overlapping or interfering with the pivoting along the axis at right angles to that edge (refer again to FIG. 10A for this pivoting action). The socketed plate 112 shown in FIG. 10 has a diagonal triangular piece removed at the corner eliminating most of the headed socketed or the socketed portions in that area. FIG. 12 shows how these diagonal cuts of diagonally adjacent socketed plates fit together in various degrees of tension and flexing. Despite these cut away portions there are very limited areas of the assembled non-textile fabric that would constitute an opening or passage through the plane of the non-textile fabric. For most applications the presence of any openings does not constitute a performance problem since the openings are relatively small and the adjacent surfaces would tend to close up these openings unless the fabric is undergoing extreme bending or flexing.

In the preferred process, an array of barbed plates 110 (FIG. 9) is formed at the nip between rollers 1 and 2 as outlined above with respect to the first-described embodiment. These thus formed plates are transferred to roller 2, and pellets 122 are placed in the selected recesses 124 of roller 2 in preparation for forming the socketed plates 112. FIG. 13 shows a cross-section through rollers 2 and 3 at the nip intersection where the mold for the socket plate 112 has been formed, just prior to initiating the actuator 124 and striker 126 to form that plate 112. Notice the main portion of the mold cavity is formed from the corresponding indentations of dimples in the aligned surfaces of the roller outer surfaces. The edges of two of the already formed barbed plates are shown to protrude into the mold cavity, so these edges themselves form a portion of the mold cavity surface. Of course not shown in this FIG. 9 is the other pair of barbed plates arrayed at right angles to the pair shown, these having a corresponding pair of barbed edges suspended in this mold cavity. Thus substantially all of the first inter-engaging surfaces of the four barbed edges, one from each of the surrounding four barbed plates, the mold surfaces of the rollers aligned at the nip, and to a minor degree the front face 128 of the striker, once it forces the pellet 122 to plastically conform into the mold, constitute the mold cavity for forming each socketed plate 112 and the resulting array of socketed plates. In this way, the array of overlapping (or more precisely alternately embedded and embedding) barbed 110 and socketed plates 112 form strong, tough, and relative to the rigid materials used, flexible non-textile fabric shapes. The direct forming process of the present invention for this embodiment of the non-textile fabric requires only two processing steps (e.g., using only three rollers and two nip areas) as compared to three processing steps for the previously described embodiment since the inter-engaging surfaces of the embedded and embedding plate structures serve to also connect the plates together, eliminating the step of forming connecting rivet structures of the previous embodiment.

Figure 14A:
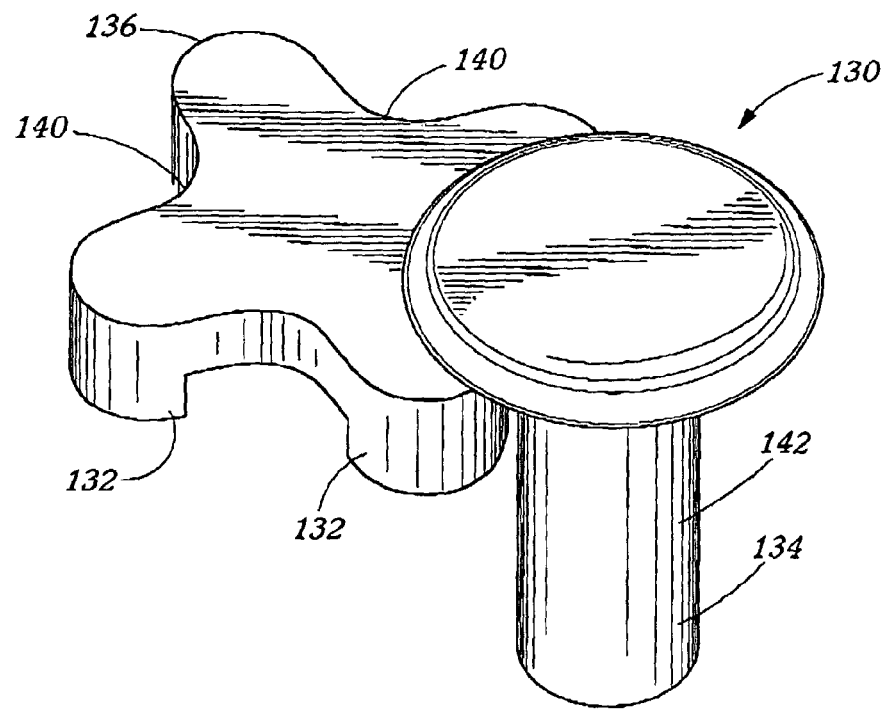
FIGS. 14A and B show another alternative embodiment of the plate structure for forming the non-textile fabric of the present invention, incorporating an integrally formed rivet structure.
Figure 14B:
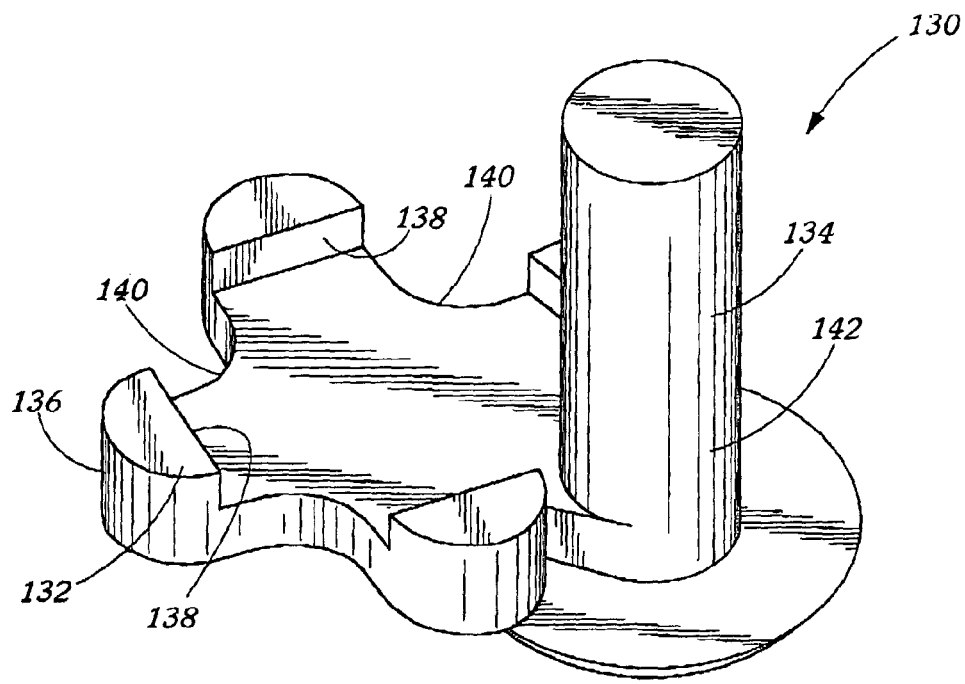

Another embodiment of the linkable elements for forming the non-textile fabric using the process of the present invention is shown in FIGS. 14A, 14B, 15 and 16. FIGS. 14A and 14B show top and bottom views of the linkable element 130 made preferably by the solid phase forming process. The structure is similar to that of the first embodiment described herein in FIGS. 1-3, however, there are no sloped cam surfaces included in the inter-engaging surfaces of edges 132 of the plate elements for counter-engagement, and the rivet 134 is integrally formed with the plate element. The straight edges 132 engage one another to keep the elements from moving laterally apart. In this embodiment, only one shape of element 130 is required and is able to be interlinked in a "legs up" (FIG. 14B) and a "legs down" (FIG. 14A) orientation using the direct forming process as described above. The plate element 130 with the integrally formed rivet 132 is formed in one single phase forming process step (with the appropriate mold cavity shape and analogous to that process step shown in FIGS. 4A, B and C). At the next processing step, the oppositely oriented plate element 130 is formed. Referring to FIG. 15, an array of interlinked "legs up" 130A and "legs down" 130B plate elements are shown with the integrally formed rivet 134A extending upwardly between the inter-linked plates. This array is the result of two of three total forming steps. This non-textile fabric shape is completed by a third forming step which forms the extending rivet shafts 134A and 134B into a rivet head through a subsequent solid phase forming step. This would require simple compression of the shaft under impact of the striker to form the rivet head, similar to that described above for the other solid phase forming processes.

FIG. 16 shows the completed non-textile fabric made up of these elements 130A and B. Referring back to FIG. 14B, each of the four legs 136 of the plate element has an edge defining a raised step 138 for engagement with the complementarily shaped edges of the oppositely positioned plate element. The step ridges 138 along the edges create a mechanical engagement to retain the plate elements 130A and B in connection with one another when the rivets 134 are fully formed. Cut-outs 140 are formed at the corners of each of the plate elements for receiving the shaft 142 of the rivet 134 which holds the two plate elements together. The degree of flexibility of this embodiment is similar to that of the first embodiment, and is somewhat related to the length (and extendibility) of the rivet shaft.

Figure 17A:
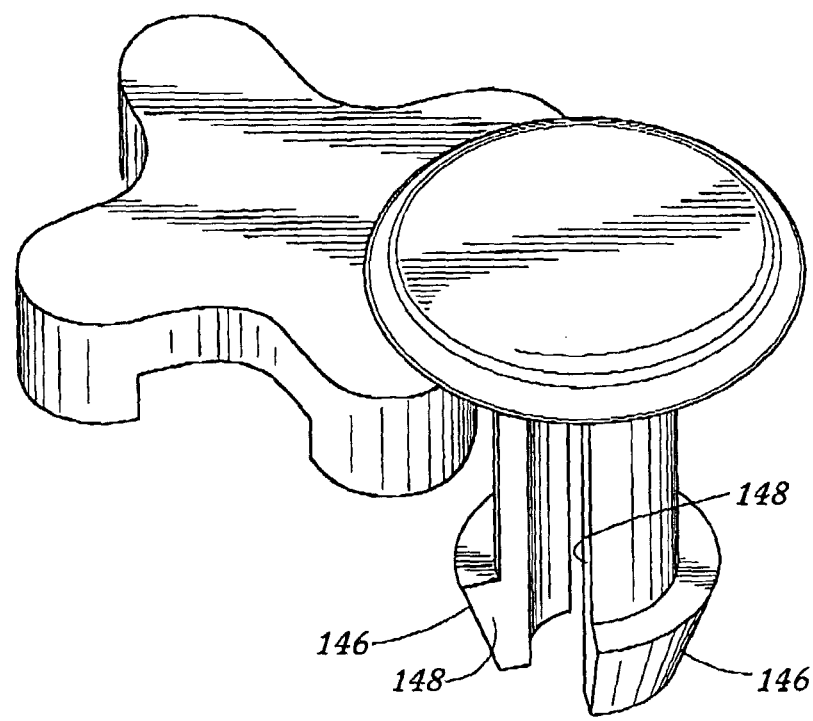
FIGS. 17A, B and C show an alternative embodiment of the plate structure for forming the non-textile fabric of the present invention, incorporating an integrally-formed rivet structure utilizing a split retainer and a separate cap.
Figure 17B:
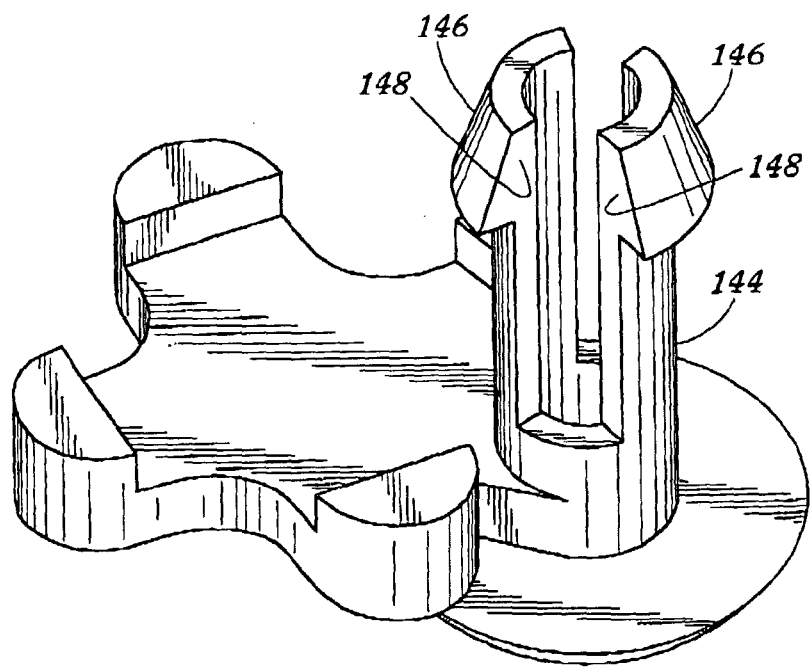
Figure 17C:
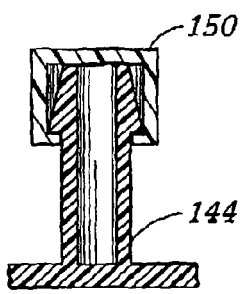
Figure 18:
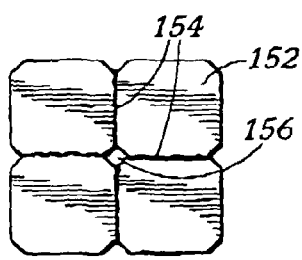
FIG. 18 shows an alternative embodiment of the non-textile fabric formed by the fusing together of separately formed elements along their respective edges, which operation is performed in the direct forming process of the present invention.

Similar to that structure as shown in FIGS. 14A and 14B, an alternative embodiment is shown in FIGS. 17A, 17B, and 17C. The plate element of this embodiment is identical to that in FIGS. 14A and 14B, however, the rivet shaft 144 in this embodiment forms a split retainer having sloped semi-annular detents 146 on each separate portion of the rivet shaft 144. The sloped semi-annular detents fit into a conformingly-shaped recess in the rivet head 150 to secure the rivet in an attached position on the end of the shaft. See FIG. 17C. The rivet head is thus secured to the end of the shaft and is very difficult to remove without compressing the sidewalls 148 of the split retainer to disengage the detents from the recess in the rivet head. This alternative embodiment shown in FIGS. 17A and B is formed by the solid phase forming process as noted above with a specially shaped mold cavity to shape the split retainer.

The direct forming process can be utilized to create another type of non-textile fabric out of inter-connected plate elements formed similarly to that above. The distinction is that the forming process is designed to fuse the separately formed elements 152 along their respective edges 154. The separately formed elements 152 are thus fused together by the forming process as described above, and they move with respect to one another by bending at or adjacent to the fused regions. The fused edges 154 are generally formed along the same regions as the barb-and-socket engagement of the earlier embodiment in FIGS. 9-12. In this embodiment, one set of plates are formed at the nip between the first and second rollers, and the second set of plates are formed and fused to the first set at the nip between the second and third rollers. The temperature, forming force, and other physical parameters of the direct molding process for this embodiment must be carefully coordinated to create a fused region sufficient to maintain the separately formed elements in engagement with one another, but allow them to bend with respect to one another to give a fabric-type of movement. The fused edges are preferably overlapped somewhat to form the region for fusing the elements along the respective adjacent edges. Apertures 156 can be formed at the corners between the elements to provide additional flexibility.

The direct forming process of the present application can be utilized in the production of the non-textile fabric for many different uses. The application of the direct forming process of the present invention in the manufacture of luggage, as an example, is described in FIG. 18. The process is shown in the form of a flow diagram having four primary sections: pellet selection 400, direct forming process 500, pellet recycle 600, and luggage case assembly 700. While the process flow of FIG. 19 is contemplated for use with the processing equipment described above, it is contemplated that the inventive direct forming process of the flow diagram can also be utilized with other equipment capable of performing the same or similar operations.

Figure 19:
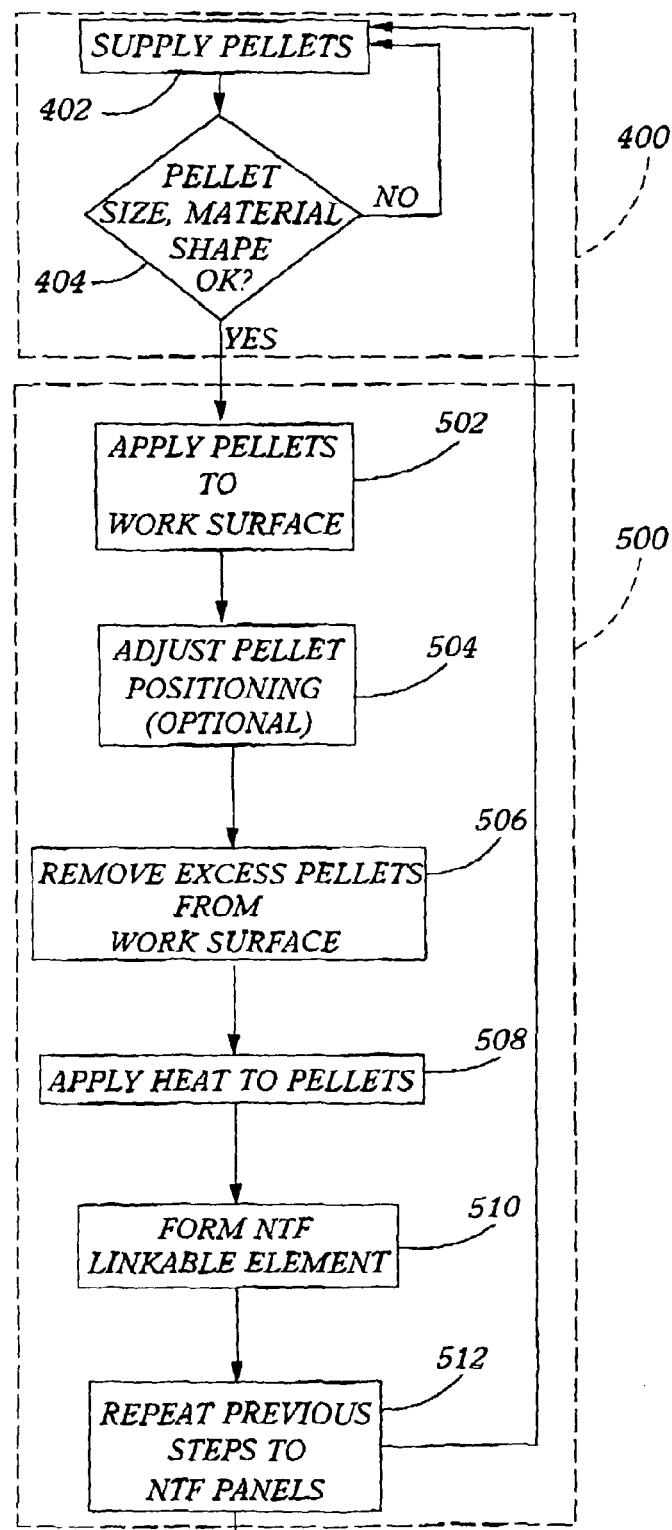
FIG. 19 is a block-diagram showing the primary steps in the process of the present invention.
Figure 19:
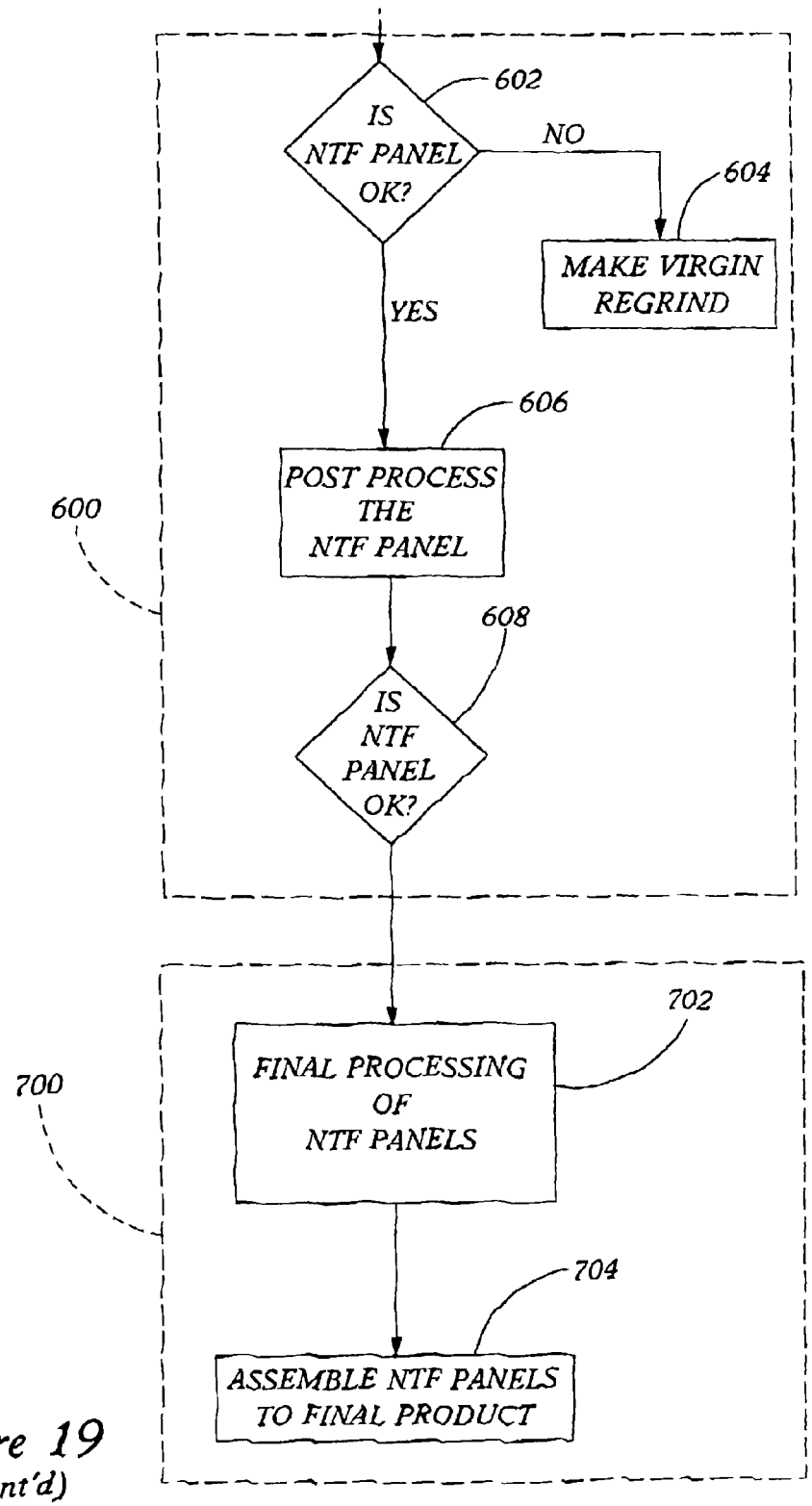

The first step of the flow diagram of FIG. 19 is the step 402 of supplying pellets. The preferred pellet size, shape and material must be provided for the direct forming process. The first decision block 404 confirms that the pellet size, shape and material are consistent with the forming process. If not, the decision box routes back to the supply pellets step to start over. The pellets can also be used for normal polymer processing at this time, for instance to form other parts of the final product. If affirmative, the process continues to the beginning of the direct forming process 500.

The first step in the direct forming process 500 is the step 502 for applying pellets to the work surface. At this step, the pellets, as described above, are applied to the work surface in preparation for the solid phase forming step. In the above examples, the work surface is the surface of the roller. At this point, the pellets are applied to the work surface in any number of ways, such as by hopper application or fluidized bed application as discussed above, and are preferably positioned in the recesses formed adjacent the mold cavities in the work surface. The next step 504 is to adjust the pellet positioning on the work surface if necessary. This step is optional since the pellets, when applied to the work surface, may all be properly positioned in the recesses adjacent in the mold cavities formed in the work surface. If, however, there are excess pellets, or the pellets are not properly oriented in the recesses, the step of adjusting the pellet positioning is helpful to correct any problems. The step of adjusting the pellet positioning can be done, as described above, by a cushioned roller or other type of device suitable for this step. The next operation 506 is to remove the excess pellets from the work surface. After the pellets are applied to the work surface, and adjusted if necessary, the excess pellets should be removed from the work surface so that they do not interfere with the solid phase forming step. This can be done by a scraper structure, or by vacuum technique, or by any other operation that suitably removes the unwanted pellets from the work surface.

At operation 508, which is the application of heat to the pellets, the solid phase forming process actually begins. The application of heat to the pellets is only necessary if the heat generated by the solid phase transformation of the pellet into the mold cavity is not sufficient to create the desired temperature in the pellet. In other words, if the heat generated by the transformation from its shape to that of the mold cavity due to the impact of the striker is not sufficient, as described above, supplemental heat may be necessary. The ultimate temperature to which the pellet should be heated is above the softening point but below the melting point of the particular polymer forming the pellet. After the heat management of the pellet has been performed, the actual solid phase transformation step is performed at operation 510. The solid phase forming step has been described in great detail above, and to reiterate the description above, it can be performed using the rollers as described therein, or any other type of solid phase forming structure as applicable. One of the keys here is that the result of the solid phase forming is a linkable element for use in direct forming a non-textile fabric. This linkable element, such as the "legs up" plate, the "legs down" plate, and the rivet, are each formed consecutively so that the final product is a collection of interlinked elements forming the non-textile fabric. As described above, the first element to be formed in the exemplary process is the "legs up" plate formed at the nip between the first and second rollers. The next operation is to repeat the previous steps to form the interlinked elements in the particular order required to form the non-textile fabric panels. This operation is denoted at 512. Operation 512 requires that the formation steps previously described are repeated a sufficient number of times to form a non-textile fabric panel out of the linkable elements. In the specific process described above, this process would need to be performed three times to form the "legs up" plate, then the "legs down," and then the rivet to hold the two plates together. In the second embodiment described above, this process would be repeated twice to form the panel having the barbed ends and then the panel for receiving the barbed ends (no additional third piece such as the rivet is required in that embodiment as described above).

After operation 512, the flow diagram starts the pellet recycle operation 600. The first operation is a decisional block 602 inquiring whether or not the non-textile fabric panel is satisfactory. If no, at operation 604 the failed non-textile fabric panel is converted to virgin regrind for use in either forming normally molded parts for the final product, or to be reformed into pellets for application at step 402. If the non-textile fabric panel is acceptable, the next operation is at 606 where post processing of the non-textile fabric panel occurs. This post processing can include polishing, cutting, bending, or other acts that are required to be taken to prepare the non-textile fabric panel for use in the final product. After operation 606, the decisional block 608 inquires whether the non-textile fabric panel is still okay after the initial post process. If for any reason the non-textile fabric panel has been irreparably damaged at operation 606, the answer to the decisional 608 is no and the damaged but partially processed non-textile fabric panel is again used to make virgin regrind at step 604. If the non-textile fabric panel is satisfactory after the initial post process operation 606, the non-textile fabric panel is taken to the final processing of the non-textile fabric panel operation at 702. The final two steps are in the luggage case assembly operation 700. After the final processing of the non-textile fabric panels, which can include further refinement of the surface, and further processing to make the non-textile fabric ready for final assembly, the flow diagram moves to operation 704. At operation 704, the assembly of the non-textile fabric panels with the final product is performed. For instance, the non-textile fabric panels would be positioned and attached to the outer surface of a luggage case. The luggage case could be formed of the virgin regrind from the waste pellets regenerated at steps 404 and 604.

The above flow diagram is an example of one type of specific product processing that can be performed with the direct forming process of the present invention. Primarily, the flow diagram can be particularized to a specific product type by modifying the last two steps 702, 704 in the fourth generic operation region 700. For instance, the use of the non-textile fabrics could be joined to one another at their edges using sewing or other bonding techniques, and the resulting three dimensional shape could be attached to a frame or wheel assembly to make a luggage chassis. Alternatively, the non-textile fabric can be used for automobile interior accessories, or other products.

Although the present invention has been described with a certain degree of particularity, it is understood that the present disclosure has been made by way of example, and changes in detail or structure may be made without departing from the spirit of the invention as defined in the appended claims.

What is claimed is:

1. A method for manufacturing a non-textile fabric comprising an interconnected array of first elements and second elements forming a flexible or bendable web, including the acts of:

forming at least three of said first elements so that each has first inter-engaging surfaces enabling it to inter-engage with one of said second elements and so that each has further inter-engaging surfaces enabling each to inter-engage with at least one other of said second elements; and forming said one of said second elements such that it is in the form of a plate structure and is in intimate pivoting mechanical connection with said at least three first elements by molding said one of said second elements against substantially all of said first inter-engaging surfaces of each said at least three first elements;

wherein said first elements are plate structures;

wherein forming said first elements includes the act of solid phase forming said first elements by positioning a polymer pellet in a first mold cavity and forcing said polymer pellet in said first mold cavity to adapt the shape of said first mold cavity; and wherein forming said second element includes the act of solid phase forming said second element by positioning a polymer pellet in a second mold cavity and forcing said polymer pellet in said second mold cavity to adapt the shape of said second mold cavity and be operably connected with said first element.

2. A method as defined in claim 1, wherein at least a portion of said first inter-engaging surfaces of said first element forms a portion of said second mold cavity.

3. The method of claim 1 wherein said first inter-engaging surfaces include at least one sloped cam surface.

4. The method of claim 3 wherein said at least one cam surface is linear.

5. The method of claim 1 wherein said first inter-engaging surfaces include a top wall and include sidewalls perpendicular to the plane of the non-textile fabric web.

6. A method for manufacturing a non-textile fabric comprising an array of interconnected elements forming a flexible or bendable web, including the acts of:

forming at least one first element having at least one cam surface enabling it to interconnect to a second element, said at least one first element is a plate structure and said cam surface being sloped relative to the plane of the non-textile fabric;

forming said second element by molding said second element in the form of a plate structure and molding it against said at least one cam surface of said first element; and forming a third element by molding said third element against at least one of said first and said second elements such that said first, second and third elements are intimately mechanically connected to one another such that the first element and the second element can move relative to one another;

wherein forming said first element includes the act of solid phase forming said first element by positioning a polymer pellet in a first mold cavity and forcing said polymer pellet to adapt the shape of said first mold cavity;

wherein forming said second element includes the act of solid phase forming said second element by positioning a second polymer pellet in a second mold cavity and forcing said second polymer pellet to adapt the shape of said second mold cavity; and wherein forming said third element includes the act of solid phase forming said third element by positioning a third polymer pellet in a third mold cavity and forcing said third pellet to adapt the shape of the third mold cavity and be operably connected with said first and second elements.

7. A method as defined in claim 6, wherein said first element forms a portion of said second mold cavity.

8. A method as defined in claim 6, wherein said second element forms a portion of said third mold cavity.

9. A method as defined in claim 6, wherein said first and said second elements form a portion of said third mold cavity.

10. A method as defined in claim 6, wherein:
said third element is formed at least in part against said second elements.

11. A method as defined in claim 6, wherein:
said third element is formed at least in part against said first and second elements.

12. A method as defined in claim 6, wherein said second element forms a portion of the third mold cavity.

13. A method as defined in claim 6, wherein at least one of said first element and said second element forms a portion of the third mold cavity.

14. The method of claim 6 wherein said third element is in the form of a rivet.

15. The method of claim 6 wherein said at least one cam surface is linear.

16. A method of making a non-textile fabric comprising the acts of:

providing a first roller, a second roller, a third roller, and a first nip region between said first and second rollers, and a second nip region between said second and third rollers, said rollers having work surfaces;

forming at least a first element at said first nip region; and forming at least a second element at said second nip region by using at least a portion of said first element, said second element being formed in an interconnected manner with said first element;

wherein the two forming steps are performed by:

applying a first plastic pellet to said work surface on said first roller;

aligning said work surface on said second roller with said work surface on said first roller in said first nip region to form a first mold cavity;

solid phase forming said plastic pellet in said mold cavity in said first nip region to form said first element;

applying a second plastic pellet to said work surface on said second roller;

aligning said work surface on said third roller with said work surface on said second roller in said second nip region to form a second mold cavity; and solid phase forming said second plastic pellet in said second mold cavity in said second nip region to form said second element in an interconnected manner with said first element.

17. A method of making a non-textile fabric comprising the acts of:

providing a first roller, a second roller, third roller, and a fourth roller, and a first nip region between said first and second rollers, a second nip region between said second and third rollers, and a third nip region between said third and fourth rollers, said rollers having work surfaces;

forming at least a first element at said first nip region;

forming at least a second element at said second nip region by moving against at least a portion of said first element, said second element being formed in an inter-engaging manner with said first element; and forming at least a third element at said third nip region; said third element being formed so as to interconnect said inter-engaging first and second elements;

wherein the three forming steps are performed by:

applying a first plastic pellet to said work surface on said first roller;

aligning said work surface on said second roller with said work surface on said first roller in said first nip region to form a first mold cavity;

solid phase forming said plastic pellet in said mold cavity in said first nip region to form said first element;

applying a second plastic pellet to said work surface on said second roller;

aligning said work surface on said third roller with said work surface on said second roller in said second nip region to form a second mold cavity;

solid phase forming said second plastic pellet in said second mold cavity in said second nip region to form said second element in an inter-engaged manner with said first element;
applying a third plastic pellet to said work surface on said third roller;
aligning said work surface on said fourth roller with said work surface on said third roller in said third nip region to form a third mold cavity; and
solid phase forming said third plastic pellet in said third mold cavity in said third nip region to form said third element to interconnect said first and second elements.

18. The method of claim 17, wherein said first and second elements form part of said third mold cavity.

19. A method for manufacturing a non-textile fabric including the acts of:
forming a first element; and
forming a second element in operable connection with said first element by molding said second element against said first element wherein:
forming said first element includes the act of solid phase forming said first element; and
forming said second element includes the act of solid phase forming said second element, forming said first element includes the acts of positioning a plastic pellet in a first mold cavity;
forcing said plastic pellet in said first mold cavity to adapt the shape of said first mold cavity;
forming said second element includes the acts of positioning a plastic pellet in a second mold cavity;
forcing said plastic pellet in said second mold cavity to adapt the shape of said second mold cavity and be operably connected with said first element.

20. A method as defined in claim 19, wherein said first element forms a portion of said second mold cavity.

21. The method of manufacturing a non-textile fabric as set forth in claim 20 wherein at least one of said plastic pellets is made of a polymer.

22. The method of manufacturing a non-textile fabric as set forth in claim 20 wherein at least one of said plastic pellets is a briquette.

23. The method of manufacturing a non-textile fabric as set forth in claim 22 wherein the briquette is made of a polymer.

24. The method of manufacturing a non-textile fabric as set forth in claim 22 wherein the briquette is made of ultra high molecular weight polyethylene.

25. A method for manufacturing a non-textile fabric including the acts of:
forming a first element;
forming a second element by molding said second element against said first element; and
forming a third element by molding said third element against at least one of said first and said second elements such that said first, second and third elements are operably connected to one another wherein:
forming said first element includes the act of solid phase forming said first element;
forming said second element includes the act of solid phase forming said second element; and
forming said third element includes the act of solid phase forming said third element, and wherein:
forming said first element includes the acts of
positioning a plastic pellet in a first mold cavity;
forcing said plastic pellet to adapt the shape of said first mold cavity;
forming said second element includes the acts of
positioning a second plastic pellet in a second mold cavity;
forcing said second plastic pellet cavity to adapt the shape of said second mold cavity;
forming said third element includes the acts of
positioning a third plastic pellet in a third mold cavity;
forcing said third plastic pellet to adapt the shape of the third mold cavity and be operably connected with said first and second elements.

26. A method as defined in claim 25, wherein said first element forms a portion of said second mold cavity.

27. A method as defined in claim 25, wherein said second element forms a portion of said third mold cavity.

28. A method as defined in claim 25, wherein said first element and said second elements form a portion of said third mold cavity.

29. A method as defined in claim 25, wherein said second element is formed at least in part against said first element.

30. The method of manufacturing a non-textile fabric as set forth in claim 25 wherein at least one of the first-named plastic pellet, the second-named plastic pellet and the third-named plastic pellet is made of a polymer.

31. The method of manufacturing a non-textile fabric as set forth in claim 25 wherein at least one of the first-named plastic pellet, the second-named plastic pellet and the third-named plastic pellet is a briquette.

32. The method of manufacturing a non-textile fabric as set forth in claim 31 wherein the briquette is of made of a polymer.

33. The method of manufacturing a non-textile fabric as set forth in claim 29 wherein the briquette is made of Ultra High Molecular Weight Polyethylene.

* * * * *